United States Patent
Sajwaj et al.

(10) Patent No.: US 11,686,840 B2
(45) Date of Patent: Jun. 27, 2023

(54) SYSTEM AND METHOD FOR REMOTE DAM MONITORING

(71) Applicant: Rezatec Limited, Oxfordshire (GB)

(72) Inventors: Todd Sajwaj, Oxford (GB); Henry Brown, Abingdon (GB)

(73) Assignee: Rezatec Limited, Oxfordshire (GB)

( * ) Notice: Subject to any disclaimer, the term of this patent is extended or adjusted under 35 U.S.C. 154(b) by 171 days.

(21) Appl. No.: 17/112,558

(22) Filed: Dec. 4, 2020

(65) Prior Publication Data

US 2022/0179064 A1  Jun. 9, 2022

(51) Int. Cl.
*G01S 13/90* (2006.01)
*G01N 21/45* (2006.01)
*G01S 13/95* (2006.01)
*H04B 7/185* (2006.01)

(52) U.S. Cl.
CPC .......... *G01S 13/9023* (2013.01); *G01N 21/45* (2013.01); *G01S 13/955* (2013.01); *H04B 7/18515* (2013.01)

(58) Field of Classification Search
CPC ... G01S 13/9023; G01S 13/955; G01N 21/45; H04B 7/18515; G06T 7/246; G06T 2207/10044; G06T 2207/30184
See application file for complete search history.

(56) References Cited

U.S. PATENT DOCUMENTS

| | | | |
|---|---|---|---|
| 10,916,002 B2 * | 2/2021 | Goyal | G06T 5/50 |
| 2012/0275699 A1 * | 11/2012 | O'Hara | G06T 7/174 |
| | | | 382/168 |
| 2021/0041398 A1 * | 2/2021 | Van Wyk | G01N 29/04 |
| 2022/0179065 A1 * | 6/2022 | Ikefuji | G06T 7/00 |

FOREIGN PATENT DOCUMENTS

CN  105866776 A  *  8/2016  ............... G01B 7/16

OTHER PUBLICATIONS

P. Berardino, G. Fornaro, R. Lanari and E. Sansosti, "A new algorithm for surface deformation monitoring based on small baseline differential SAR interferograms," in IEEE Transactions on Geoscience and Remote Sensing, vol. 40, No. 11, pp. 2375-2383, Nov. 2002, doi: 10.1109/TGRS.2002.803792 (Year: 2002).*

A. Ferretti, C. Prati and F. Rocca, "Permanent scatterers in SAR interferometry," in IEEE Transactions on Geoscience and Remote Sensing, vol. 39, No. 1, pp. 8-20, Jan. 2001, doi: 10.1109/36.898661 (Year: 2001).*

(Continued)

*Primary Examiner* — Vladimir Magloire
*Assistant Examiner* — Yonghong Li
(74) *Attorney, Agent, or Firm* — Foley & Lardner LLP

(57) ABSTRACT

A system and method for identifying damage to an embankment includes acquiring satellite imagery of an area of the embankment, generating a set of input data from the satellite imagery, removing at least one anomaly in the set of input data to obtain a cleaned set of input data, and identifying the damage by determining a dam motion area indicative of ground motion in the embankment from the cleaned set of input data and determining an anomalous vegetation area and an anomalous wetness area indicative of seepage in the embankment from the cleaned set of input data.

12 Claims, 25 Drawing Sheets

(56) References Cited

OTHER PUBLICATIONS

Wang, X., Smith, K. & Hyndman, R. Characteristic-Based Clustering for Time Series Data. Data Min Knowl Disc 13, 335-364 (2006). https://doi.org/10.1007/s10618-005-0039-x (Year: 2006).*

Janssen, V., Ge, L. & Rizos, C. Tropospheric corrections to SAR interferometry from GPS observations. GPS Solutions 8, 140-151 (2004). https://doi.org/10.1007/s10291-004-0099-1 (Year: 2004).*

Bakon, M. et al. (2017) A Data Mining Approach for Multivariate Outlier Detection in Postprocessing of Multitemporal InSAR Results. IEEE Journal of Selected Topics in Applied Earth Observations and Remote Sensing, IEEE, 10(6), 2791-2798.

International Search Report and Written Opinion for PCT/IB2021/059145 dated Mar. 7, 2022, (17 pages).

Killick, R., & Eckley, I. (2014). changepoint: An R package for changepoint analysis. Journal of statistical software, 58(3), 1-19.

Main-Knorn, M., Pflug, B., Louis, J., Debaecker, V., Miller-Wilm, U., & Gascon, F. (Oct. 2017). Sen2Cor for sentinel-2. In Image and Signal Processing for Remote Sensing XXIII (vol. 10427, p. 1042704). International Society for Optics and Photonics.

Nedkov, R. (2017). Orthogonal transformation of segmented images from the satellite Sentinel-2. Comptes rendus de l'Academie bulgare des Sciences, 70(5), 687-692.

Qiu, S., Zhu, Z., & He, B. (2019). Fmask 4.0: Improved cloud and cloud shadow detection in Landsats 4-8 and Sentinel-2 imagery. Remote Sensing of Environment, 231, 111205.

Wang, X., Smith, K. A., & Hyndman, R. J. (2006). Characteristic-based clustering for time series data. Data Mining and Knowledge Discovery, 13(3), 335-364.

* cited by examiner

SYSTEM AND METHOD FOR REMOTE DAM MONITORING

BACKGROUND

The following description is provided to assist the understanding of the reader. None of the information provided or references cited in this section is admitted prior art.

Dam owners and managers need to have more understanding of their dams and modernize how they monitor the conditions and potential risks while also looking for ways to reduce operational costs, maintain supply and improve dam safety, reporting and compliance. Most dams, reservoirs, and dikes were built between 100 and 50 years ago when there was less understanding of the effects of hydrological conditions and earthquakes. Many dams, reservoirs, and dikes are in need of renovation. Making the problem even more important, as populations expand, more people are living inside floodplains. Furthermore, environmental change is intensifying both floods and drought putting greater stress on the designs of dams, reservoirs, and dikes.

The appropriate frequency of monitoring required to assure their structural integrity is not always feasible. Dams are often built in remote locations, making manual surveillance unsafe and expensive. There is a need to reduce the risk of catastrophic dam failure and drive large-scale operational efficiencies remotely.

SUMMARY

Aspects of example embodiments of the present disclosure relate generally to a dam or embankment monitoring system and method using geospatial imagery and artificial intelligence to deliver frequent, accurate insights across multiple dams. The system and method described include a retrospective analysis that accurately highlights trends and anomalies. Continuous ongoing monitoring of the system and method alerts dam owners to unusual changes in ground motion, vegetation and moisture levels, helping deploy resources to the right place at the right time.

Advantageously, by providing a clear, continuous picture of an entire asset base the system and method can yield a range of user benefits, including demonstrable operational expenditure cost reductions by cutting non-targeted inspection and maintenance, reduced safety risk and duty of care, and a clear, contextualized user interface dashboard reporting to help inform key stakeholders.

The system, method, apparatus, and computer readable medium described herein provide a detailed historical and current view of all dams operated by an organization that alert to unusual changes in ground motion, vegetation and moisture, thereby reducing reliance on site inspections. A subscription provides access to an interactive dashboard with alerts and notifications to flag anomalies and users can dynamically interrogate data using complex filtering to zero in on what matters across tables, maps and charts. Monthly updates ensure judgements are made based on relevant information.

In accordance with some embodiments of the present disclosure, the geospatial imagery and artificial intelligence detects topographic and vegetation changes over time using satellite radar and optical data to: assess and flag trends, anomalies, and rate of change outside seasonal norms to the nearest 2-3 mm; deliver a dynamic picture from monthly temporal updates; and provide a retrospective analysis from historical records.

In accordance with some embodiments of the present disclosure, a method is disclosed. The method includes acquiring, by a processor executing computer-readable instructions stored on a memory, satellite imagery of an area of an embankment, generating, by the processor, a set of persistent scatterer data points from the satellite imagery, and determining, by the processor, a dam motion area indicative of ground motion in the embankment from the set of persistent scatterer data points. Determining the dam motion area includes removing, by the processor, at least one anomaly in the set of persistent scatterer data points to obtain a cleaned set of persistent scatterer data points, computing, by the processor, an additional data point value in the area of the embankment having missing data, such that the additional data point value is computed from the cleaned set of persistent scatterer data points by applying a spatial interpolation algorithm, and identifying, by the processor, at least two data points from the cleaned set of persistent scatter data points and the additional data point value that are part of a temporal group and separated by less than a predetermined distance from each other, wherein the at least two data points are indicative of the dam motion area.

In accordance with some other embodiments of the present disclosure, another method is disclosed. The method includes acquiring, by a processor executing computer-readable instructions stored on a memory, satellite imagery of an area of an embankment, generating, by the processor, a set of optical images from the satellite imagery, and determining, by the processor, an anomalous vegetation area and an anomalous wetness area indicative of seepage in the embankment from the set of optical images. Determining the anomalous vegetation area and the anomalous wetness area includes performing, by the processor, a Tasseled Cap transformation on the set of optical images for obtaining a first set of data points corresponding to a greenness Tasseled Cap band and a second set of data points corresponding to a wetness Tasseled Cap band, determining, by the processor, a principal component value from each of the first set of data points and the second set of data points, identifying, by the processor, the anomalous vegetation area based upon a first standard deviation of the principal component values of the first set of data points from a first mean principal component value, and identifying, by the processor, the anomalous wetness area based upon a second standard deviation of the principal component values of the second set of data points from a second mean principal component value.

In accordance with yet other embodiments of the present disclosure, a non-transitory computer-readable media having computer-executable instructions embodied thereon is disclosed. The computer-executable instructions when executed by a processor, cause the processor to perform a process including acquiring satellite imagery of an area of an embankment, generating a set of input data from the satellite imagery, removing at least one anomaly in the set of input data to obtain a cleaned set of input data, and identifying damage to the embankment by determining a dam motion area indicative of ground motion in the embankment from the cleaned set of input data and determining an anomalous vegetation area and an anomalous wetness area indicative of seepage in the embankment from the cleaned set of input data.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Figure 1:
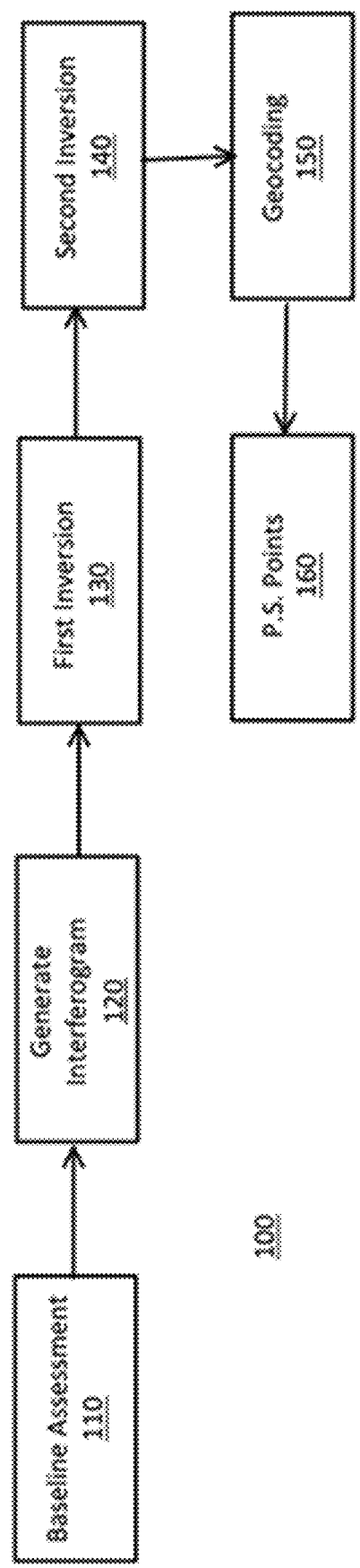
FIG. 1 is an example flow diagram outlining operations performed for generating a set of persistent scatterer data points from satellite imagery, in accordance with some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is directed to dam or embankment monitoring using geospatial artificial intelligence. The dam monitoring system of the present disclosure provides a frequent and accurate insight across many dams. The terms "dam," "dam site," "dam structure," "embankment," "embankment structure," "embankment site," and the like are used interchangeably herein. Although the present disclosure has been explained with respect to monitoring a dam or embankment, the present disclosure may also be used for monitoring dikes, reservoirs, and other structures that may benefit from such monitoring. The dam monitoring system of the present disclosure also provides retrospective or historic analysis to accurately highlight trends and anomalies. Continuous ongoing dam monitoring may alert dam owners to unusual changes in ground motion, vegetation, and moisture levels, thereby helping deploy resources to the right place at the right time, while reducing reliance on on-site inspections. Thus, by providing a clear and continuous picture of a dam, the dam monitoring system of the present disclosure may yield a range of user benefits such as cost reductions by cutting non-targeted inspection and maintenance, reduced safety risk and duty of care, as well as clear and contextualized dashboard reporting to help inform key stakeholders.

Example embodiments described herein include a dam or embankment monitoring technology having regular observations of potential symptoms of weakness or potential failure of such structures. One potential symptom of weakness in a dam structure may be structural movement. Such movement may be detected using an interferometric analysis of space-borne synthetic aperture radar (SAR) phase data to detect small movements over time. This SAR data may be used to check for any structural weakness or settling.

A second potential symptom of weakness in a dam or embankment structure may be seepage. Water seeping through an embankment or dam wall may lead to increased vegetation growth and moisture content near a dam compared to normal. Such increased vegetation growth and moisture content may cause deterioration of the impounding slope of the dam. This added moisture may be observed through an analysis of multi-spectral optical imagery, regularly captured by satellite, by identifying vegetation and wetness.

According to example embodiments, the dam monitoring system of the present disclosure may implement two forms of satellite-based data analysis for monitoring for these potential symptoms relating to the integrity of a dam: Dam Motion Areas (DMAs) and Anomalous Vegetation Areas (AVAs)/Anomalous Wetness Areas (AWAs).

Dam Motion Areas (DMAs) is a methodology for combining point measurements of ground movement from Synthetic Aperture Radar (SAR) to generate a regularized assessment of ground motion that may be summarized by sections of dam length (e.g., 50 meters). This methodology may be extended to assess time-series of ground movement observations from recent years' data and ongoing measurements for anomalies out of character from the normal range of motion seen.

Anomalous Vegetation Areas (AVAs)/Anomalous Wetness Areas (AWAs) is a methodology to map metrics of vegetation vigor (e.g., greenness) and wetness along the length of, and adjacent to, the dam site, such as [1] greenness, calculated using Tasseled Cap indices and [2] wetness, calculated using Tasseled Cap indices. These indices may be assessed for anomalies with reference to an historic time series of data for the dam site to identify any areas exhibiting anomalous behavior.

Thus, the dam monitoring system of the present disclosure detects topographic and vegetation changes over time using satellite radar and optical data to assess and flag trends, anomalies and rate of change outside seasonal norms, deliver a dynamic picture from monthly temporal updates, and provide retrospective analysis from historical records.

FIG. 1 illustrates a method outlining operations of a process 100 of a persistent scatterer interferometry workflow. Additional, fewer, or different operations may be performed in the process 100 depending on the embodiment. The process 100 uses a PS-InSAR (Persistent Scatterer Interferometric Synthetic Aperture Radar) technique to monitor the temporal evolution of surface deformations. The technique extends SAR interferometry to an analysis of large sets of multi-temporal acquisitions and improves the measurement accuracy from a few centimetres (conventional interferometry approach) to a few millimetres (PS-InSAR approach). In addition, limitations typical of SAR Interferometry (i.e., atmospheric distortions or temporal de-correlation) may be reduced.

The use of large temporal series may enable the identification and minimization of atmospheric effects (artifacts) by means of a dedicated space-time filtering operation. In an operation 110 of the example method, a processor having programmed instructions for implementing the PS-InSAR technique performs a spatial, temporal baseline assessment to identify those SAR images that are robustly connected in time and space to other images in the SAR time series. After this baseline assessment, in an operation 120, the processor generates a co-registered SAR time series and then extracts differential interferograms for each pair of SAR images identified in the spatial, temporal baseline assessment. The processor then performs a first inversion on the differential interferogram in an operation 130 and a second inversion on the first inverted differential interferogram in an operation 140. The processor geo-codes the resulting data in an operation 150 and raw persistent scatterer points are output in operation 160.

Operation 110 defines the SAR pair combinations used to generate the differential interferograms. The network of differential interferograms are paired SAR acquisitions within the specified spatial baseline values. Those acquisitions that exceed the baseline values may be discarded from further Persistent Scatterer (PS) analysis.

Figure 2:
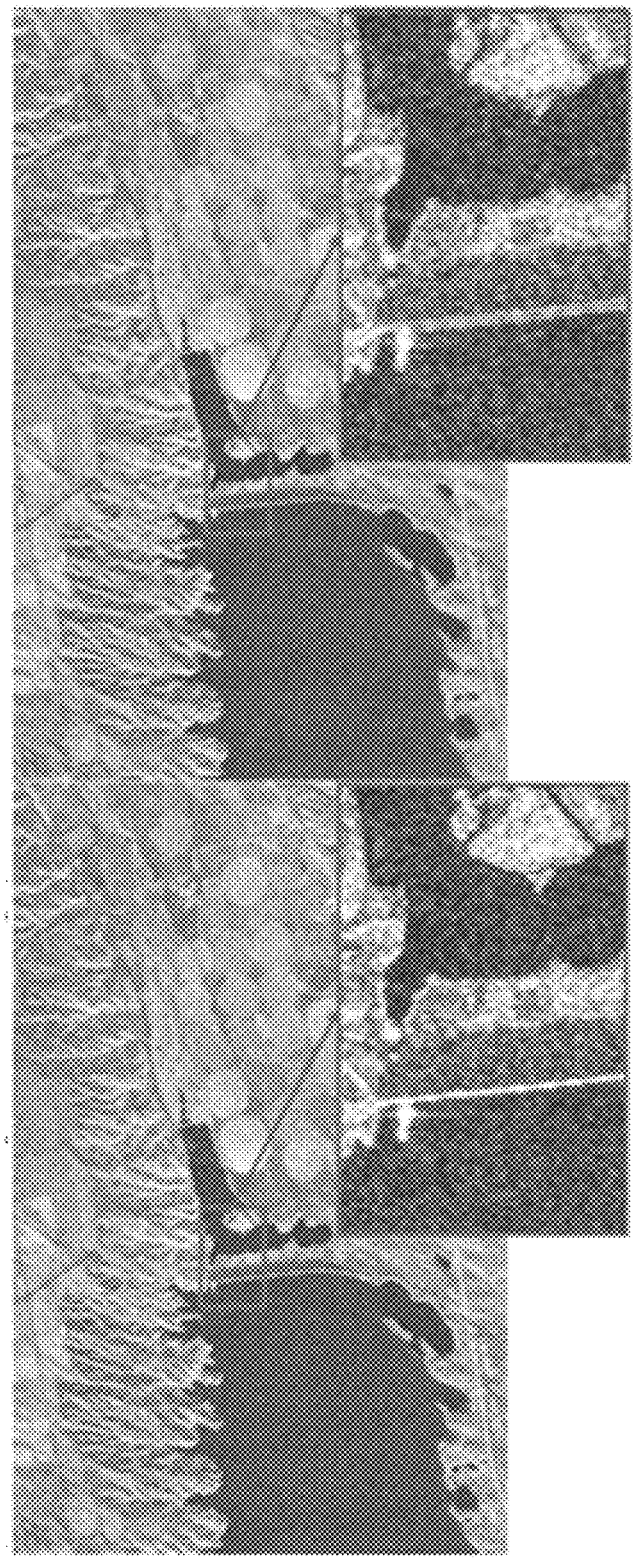
FIG. 2 are example screen shots showing precise, or crisp linear edges in the left side, and poor co-registration, having halos observed in the right side, in accordance with some embodiments.
Figure 3:
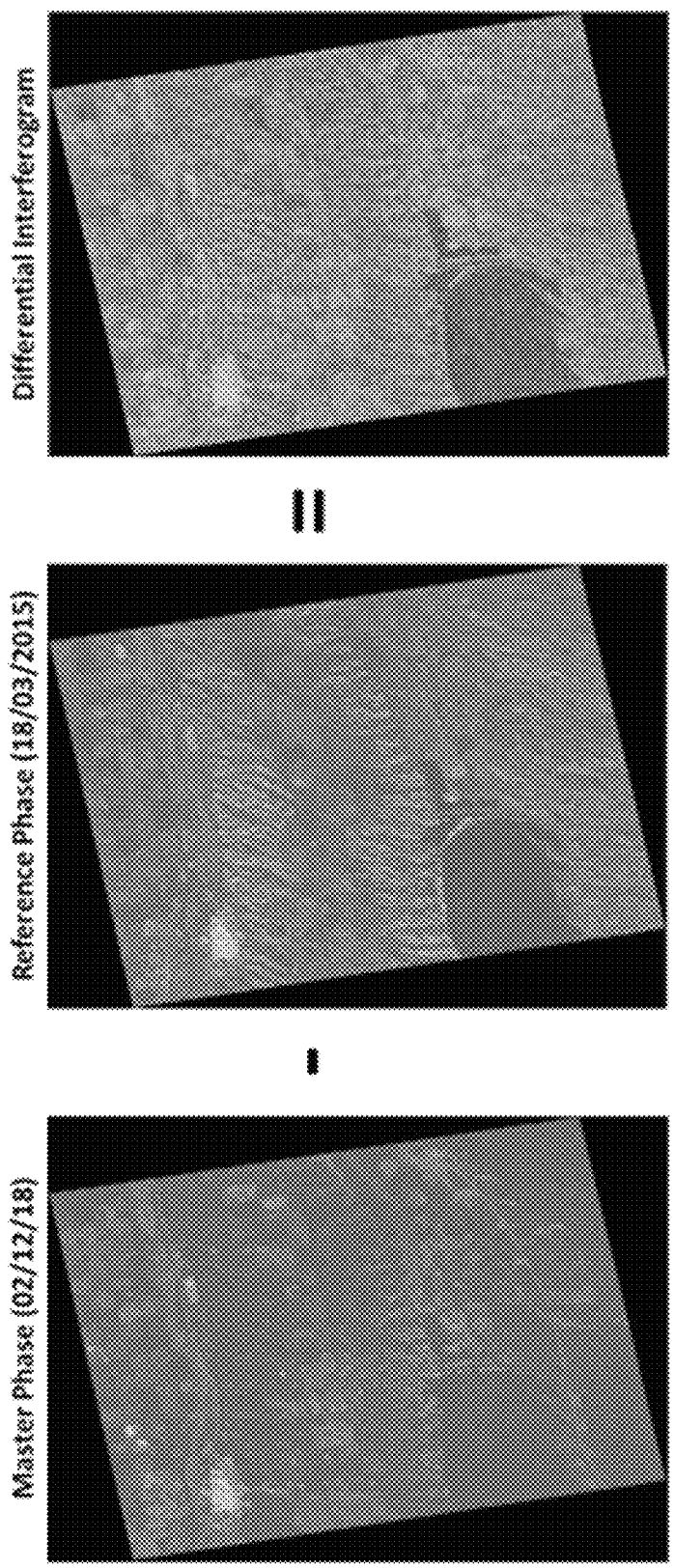
FIG. 3 is an example diagram showing differential interferogram generation, in accordance with some embodiments.

Operation 120 includes co-registration, which is a process of precisely aligning pixels of a SAR acquisition to counterparts in subsequent SAR acquisitions. Precise co-registration may be used for extraction of robust ground displacement while poor co-registration may cause processing errors. FIG. 2 illustrates examples of precise co-registration (or crisp linear edges) on the left side, and poor co-registration (having halos observed) on the right side. FIG. 3 illustrates the generation of a differential interferogram by subtracting a reference phase from a master phase. The output of this operation is a flattened interferogram in which the constant phase and the topographic phase have been removed. Thus, at the operation 120, images of the same scene taken at different times (e.g., different dates) may be overlaid to align the pixels.

Figure 4:
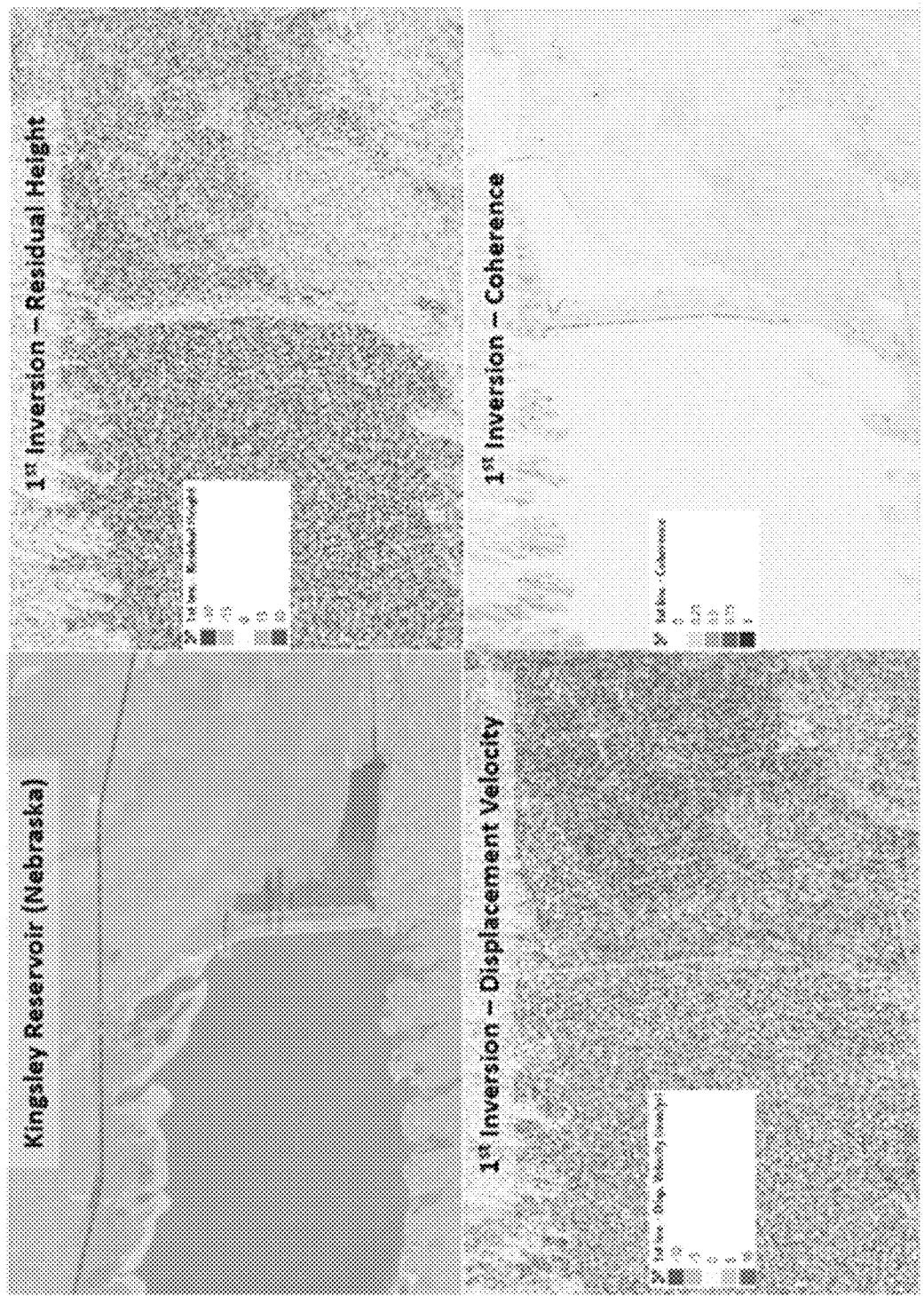
FIG. 4 are examples showing first inversion outputs, in accordance with some embodiments.

Operation 130 executes a first model inversion to derive residual height and displacement velocity that are subsequently used to flatten the differential interferograms from the operation 120. The approach may be based on identification of a certain number of coherent radar signal reflectors (i.e. persistent scatterers) that are stable and detectable from the SAR antenna (e.g. urban settlements, exposed rock outcrops). This approach takes advantage of the dense distribution of scatterers to mitigate signal propagation delay fluctuations due to tropospheric variations. FIG. 4 provides examples of inversions for residual height, displacement velocity, and coherence.

Figure 5:
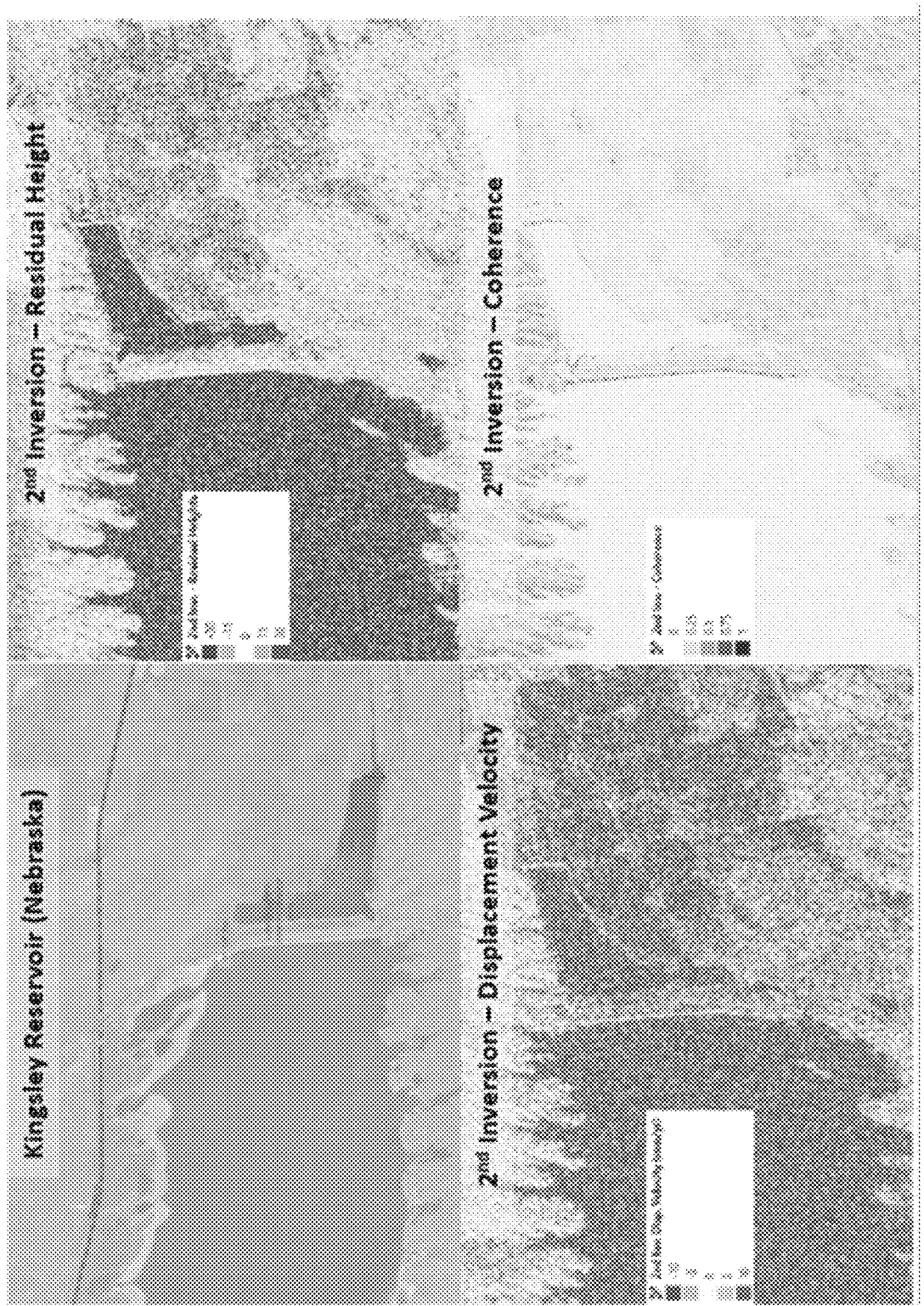
FIG. 5 are examples showing second inversion outputs, in accordance with some embodiments.

Operation 140 uses re-flattened interferograms from the first inversion to estimate the displacement related information. FIG. 5 provides examples of inversions for residual height, displacement velocity, and coherence. A linear model may be used to estimate height and displacement velocity. This operation further employs high and low pass temporal filtering to minimize the influence of atmospheric variations on estimated displacement measurements.

Figure 6:
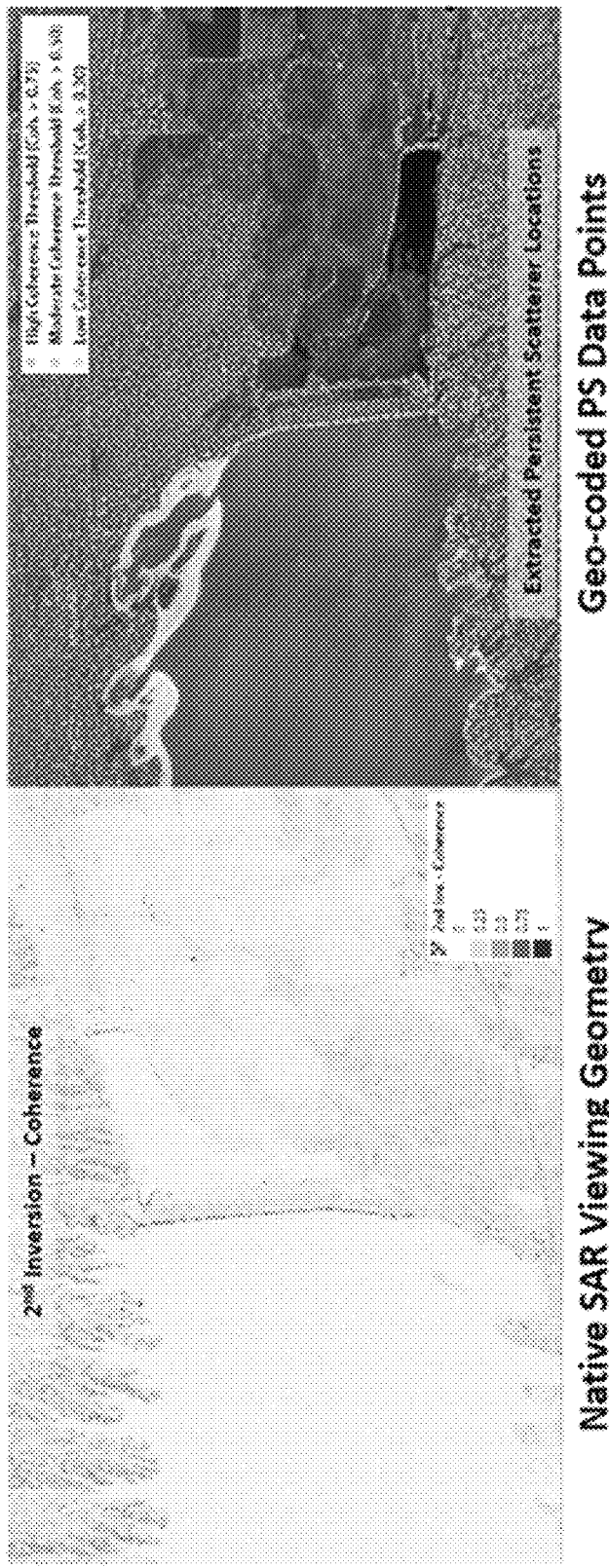
FIG. 6 are examples of coherence thresholding and geocoding, in accordance with some embodiments.

Operation 150 includes translates persistent scatterer points from SAR geometry (i.e. the native coordinate system of SAR data) to real-world coordinate systems based on a specified minimum acceptable coherence threshold. FIG. 6 illustrate a native SAR viewing geometry and geocoded PS data points according to an exemplary embodiment.

The PS-InSAR technique of the process 100 described with reference to FIG. 1, intended for the analysis of point targets, may be employed for urban areas as well as at locations where the scatterers remain stable, both radiometrically and interferometrically. The resulting product is relevant to the measurements of linear displacements and the derivation of precise heights of local scatterers, which are typically characterized by high coherence. Depending on the scatterers' stability (coherence), the achievable displacement precision can reach the precision of millimeters, while the maximum velocity value is limited by the minimum time distance between the acquisitions and the sensor wavelength.

Figure 7:
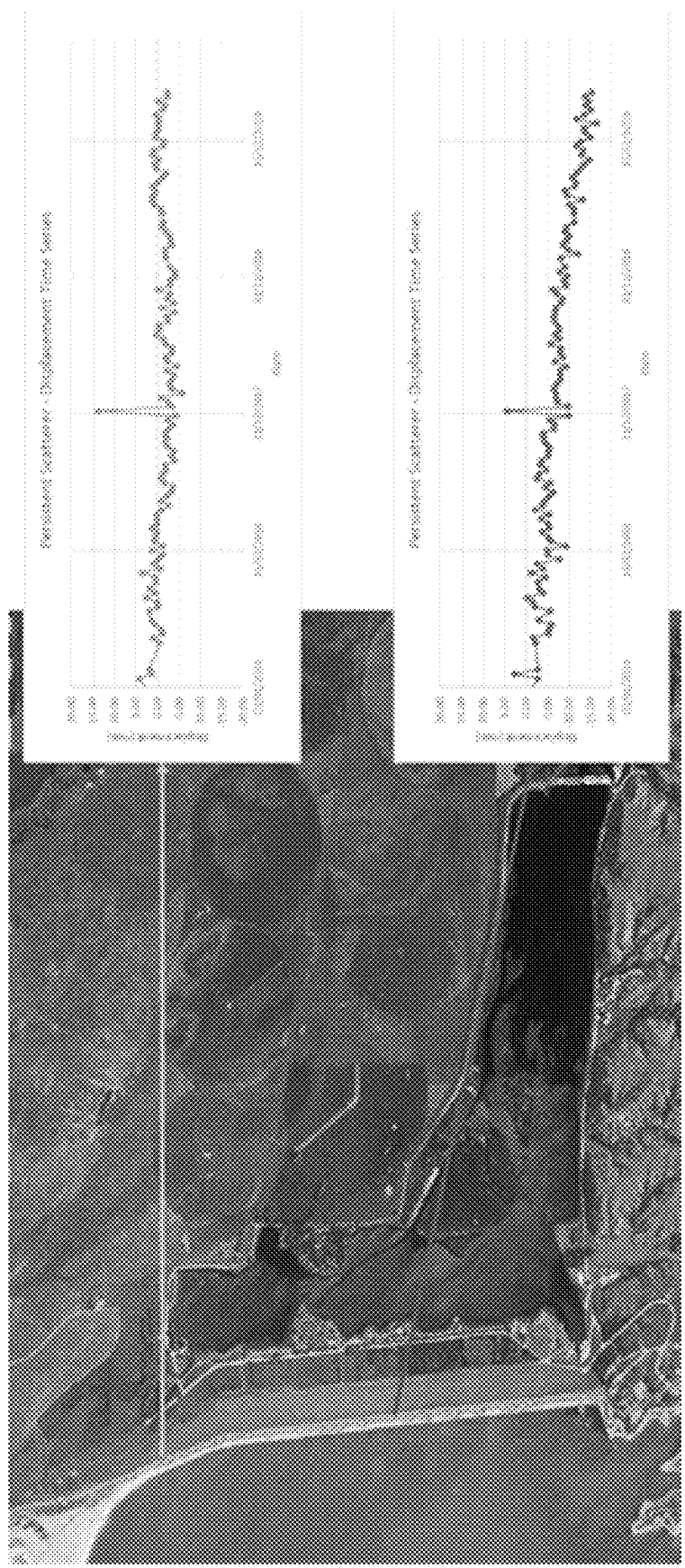
FIG. 7 are examples of persistent scatterer workflow outputs, in accordance with some embodiments.

The output of the Persistent Scatterer Interferometry Workflow of method 100 may be an ESRI (Environmental Systems research Institute) shapefile that depicts the spatial locations of each PS data point (also referred to herein as PS point, PS data point value, PS point value, and the like) and complemented with the tabular displacement history of each point. FIG. 7 illustrates persistent scatter for different geographic locations shown in a satellite image. Sample data of such an output is illustrated by Table 1 below:

slant range (Line of Sight—LOS) distance→uplift and a negative sign if the movement corresponds to an increase of the sensor-to-target slant range (LOS) distance→subsidence.

The Table 1 also includes a coherence value, which may be examined to see the robustness of the PS points over time. The "VPrecision" column corresponds to an estimate in month/year of the velocity measurement average precision. Lon/Lat are the easting and northing coordinates of the persistent scatterer in decimal degrees. The "D_YYYYMMDD" columns represent the estimated displacement from the first date in the time series. The first date displacement is 0.00.

In detail, when LOS deformation is shown, negative and positive displacements mean movements away from and toward the satellite, respectively. Decomposed vertical and horizontal movement components may be extracted. For decomposed vertical movements, negative values indicate subsidence and positive values show uplift. For decomposed

TABLE 1

Example Tabular Outputs from the Persistent Scatterer Workflow and Identified Processing Errors

| Velocity | Coherence | Vprecision | Lon | Lat | D_20150318 | D_20150529 | D_20150610 | D_20150622 |
|---|---|---|---|---|---|---|---|---|
| −0.210 | 0.954 | 0.212 | −101.672 | 41.225 | 0.00 | −5.16 | 2.29 | 0.15 |
| −1.293 | 0.929 | 0.111 | −101.675 | 41.237 | 0.00 | −7.15 | −3.17 | −2.77 |
| −2.078 | 0.916 | 0.122 | −101.672 | 41.218 | 0.00 | 1.68 | −1.15 | −1.01 |
| −1.642 | 0.893 | 0.135 | −101.671 | 41.211 | 0.00 | −2.67 | 2.48 | −0.79 |
| −1.358 | 0.884 | 0.142 | −101.672 | 41.219 | 0.00 | −0.73 | −0.68 | 0.33 |
| −2.116 | 0.883 | 0.143 | −101.673 | 41.230 | 0.00 | −1.64 | −3.92 | −7.08 |
| −1.604 | 0.880 | 0.144 | −101.673 | 41.232 | 0.00 | −6.80 | 0.64 | −1.00 |
| −1.394 | 0.876 | 0.147 | −101.671 | 41.214 | 0.00 | 0.65 | 3.52 | 3.36 |
| −1.056 | 0.783 | 0.198 | −101.672 | 41.221 | 0.00 | 14.44 | −4.60 | −4.35 |
| −2.786 | 0.876 | 0.146 | −101.673 | 41.232 | 0.00 | −3.93 | −2.88 | −4.63 |
| −1.703 | 0.872 | 0.149 | −101.674 | 41.233 | 0.00 | −11.60 | −6.47 | −4.15 |
| −0.488 | 0.871 | 0.149 | −101.671 | 41.211 | 0.00 | −1.73 | 2.12 | 1.44 |
| −1.189 | 0.871 | 0.151 | −101.672 | 41.224 | 0.00 | 2.08 | 2.36 | 0.45 |
| −1.831 | 0.870 | 0.150 | −101.674 | 41.234 | 0.00 | −6.61 | −3.01 | −3.79 |
| −2.174 | 0.863 | 0.155 | −101.672 | 41.226 | 0.00 | −0.50 | −0.49 | −1.83 |
| −2.625 | 0.861 | 0.155 | −101.673 | 41.232 | 0.00 | −5.81 | −3.64 | −5.74 |
| −1.235 | 0.861 | 0.156 | −101.672 | 41.225 | 0.00 | −0.11 | 0.61 | −0.68 |
| −2.405 | 0.861 | 0.155 | −101.674 | 41.233 | 0.00 | −4.73 | −0.41 | −0.06 |
| −1.341 | 0.859 | 0.158 | −101.673 | 41.227 | 0.00 | −2.30 | 3.27 | 3.35 |
| −1.348 | 0.858 | 0.157 | −101.675 | 41.236 | 0.00 | −8.36 | −4.20 | −3.08 |

| D_20150728 | D_20150809 | D_20150821 | D_20150902 | D_20151113 | D_20151207 | D_20151231 | D_20160124 | D_20160205 |
|---|---|---|---|---|---|---|---|---|
| −1.63 | 2.48 | 0.82 | 0.06 | 2.24 | 0.91 | −2.27 | 0.42 | 1.14 |
| −1.29 | −5.31 | −4.51 | −3.64 | −1.99 | −3.94 | −5.63 | −3.86 | −1.59 |
| −1.48 | −0.18 | 0.40 | −0.22 | −0.98 | −2.62 | −0.73 | −3.02 | −10.58 |
| 1.08 | 0.32 | 0.18 | 0.83 | 2.28 | 2.17 | 2.79 | 1.16 | −4.93 |
| −1.38 | 0.92 | 0.37 | −0.12 | 0.53 | −1.89 | −0.07 | −1.05 | −14.99 |
| −1.92 | −4.48 | −0.14 | −0.54 | −0.33 | −2.89 | −3.66 | −3.51 | 0.06 |
| 1.58 | 0.44 | 0.71 | 2.96 | 1.68 | 0.72 | 0.32 | 0.24 | 0.44 |
| 2.23 | 2.81 | 4.21 | 3.74 | 1.64 | 0.22 | −0.26 | 1.18 | −10.46 |
| −1.50 | −0.14 | 1.73 | 2.79 | −0.33 | 0.47 | 3.94 | 0.29 | 1.56 |
| −2.47 | −3.92 | 0.00 | 1.22 | −0.62 | −0.97 | −2.84 | −3.72 | 4.25 |
| −4.86 | −6.62 | −6.53 | −2.06 | −4.29 | −6.25 | −4.73 | −3.20 | −8.41 |
| 3.97 | 2.38 | 2.98 | 4.40 | 5.22 | 4.54 | 2.93 | 4.31 | 1.39 |
| 3.44 | 4.25 | 3.67 | 3.77 | 3.62 | 2.06 | 2.85 | 3.23 | 4.58 |
| −1.92 | −1.60 | −1.99 | −1.58 | −0.59 | −1.32 | −1.11 | −0.85 | −16.45 |
| −1.94 | 0.32 | −0.93 | 2.41 | 1.03 | 2.60 | −2.04 | −0.74 | 2.47 |
| −2.85 | −2.14 | −1.64 | 0.40 | −0.17 | −0.38 | −1.55 | −2.76 | 2.68 |
| 0.16 | 2.39 | 2.38 | 2.27 | 2.57 | 0.54 | 2.65 | 1.86 | −4.20 |
| 3.22 | 1.35 | 1.67 | 2.87 | 1.19 | 1.06 | 0.88 | 1.17 | 13.77 |
| 3.09 | 4.44 | 3.97 | 6.85 | 5.60 | 4.06 | 3.57 | 5.21 | 14.10 |
| 0.10 | −8.16 | −7.56 | −5.41 | −4.17 | −6.13 | −4.58 | −2.16 | −22.64 |

The Table 1 above includes a "Velocity" column that identifies the mean displacement velocity (mm/year). The displacement values are reported with a positive sign if the movement corresponds to a decrease of the sensor-to-target east movements, negative values indicate westward movements and positive values show eastward movements. Data from the Table 1 may then be used for performing a Dam Motion Area (DMA) analysis, as discussed below. DMA may be used to determine ground motion or structural movement indicative of weakness or settling in a dam.

Figure 8:
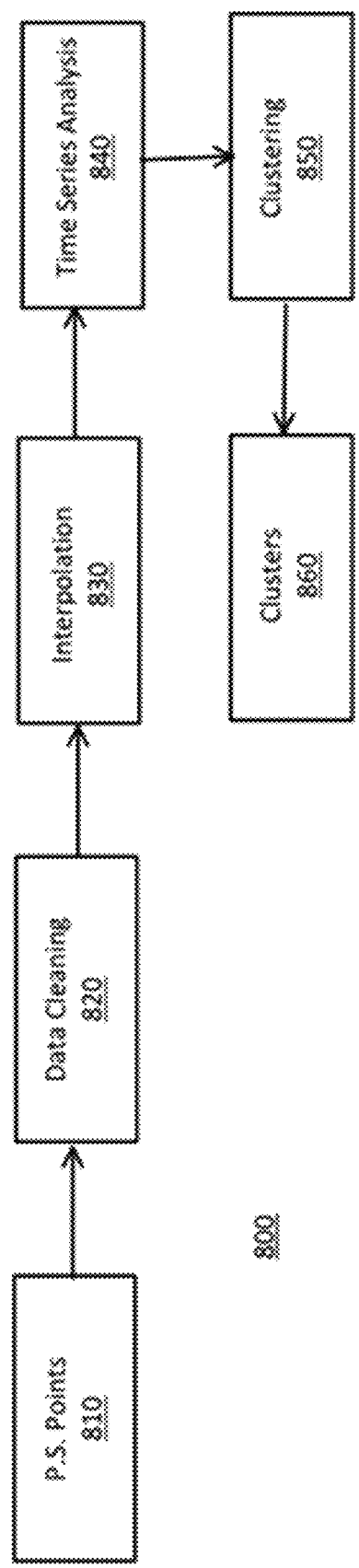
FIG. 8 is an example flow diagram outlining operations performed in a dam motion analysis workflow, in accordance with some embodiments.

FIG. 8 illustrates an example method outlining operations of a process 800 in a DMA analysis workflow, in accordance with some embodiments of the present disclosure. Additional, fewer, or different operations may be performed in the process 800 depending on the embodiment. In an operation 810, the processor acquires raw persistent scatter points. The processor data cleans the scatter points in an operation 820. In an operation 830, the processor performs a spatial smoothing interpolation on the cleaned data. The processor applies a time series analysis to the data in operation 840. In an operation 850, the processor performs a spatio-temporal clustering to produce dam motion analysis (DMA) clusters to produce clusters (860).

Operation 810 includes acquiring raw PS data points from a persistent scatter interferometry workflow such as the process 100 described with reference to FIG. 1 and Table 1 to identify temporal evolution of surface deformations. Thus, the data in Table 1 may be considered a set of persistent scatterer (PS) data points that may be analyzed to identity dam motion areas in an area of a dam. In some embodiments, the set of PS data points may correspond to data collected from a specified past time period (e.g., previous 2 years, 3 years, past couple of days, weeks, months, etc.).

Operation 820 includes a data cleaning process that removes confounding influences of regular errors introduced during the PS-InSAR processing (the process 100). The data cleaning includes the identification and removal of systematic trends arising from tectonic motion or subtle phase ramps inherent in SAR data sets using "stable" PS points. Specifically, high coherence PS points (e.g., coherence >0.9) that display small annual velocities (e.g., 0.5 mm/yr>velocity>−0.5 mm/yr) may be chosen as stable points. In other words, rows from Table 1 that have a coherence value of greater than a particular threshold (e.g., 0.9) may be identified to use for a stable point. In some embodiments, for the coherence values in Table 1 that satisfy the particular threshold, the corresponding values of velocity may be reviewed to identify those velocity values that satisfy another defined threshold (e.g., 0.5 mm/yr>velocity>−0.5 mm/yr). Rows of Table 1 that satisfy the coherence and velocity thresholds above may be selected as "stable points." A "stable point" may be considered a coherence and/or velocity value that is not moving much (e.g., moves less than a threshold) and is indicative of a good feature on the ground representative of ground movement. For example, in Table 1 above, the second row of the first two columns indicate a coherence value of greater than 0.9 and a 0.5 mm/yr>velocity>−0.5 mm/yr indicating a temporal trend in this stable points. These values may be removed from the data set.

Figure 9A:
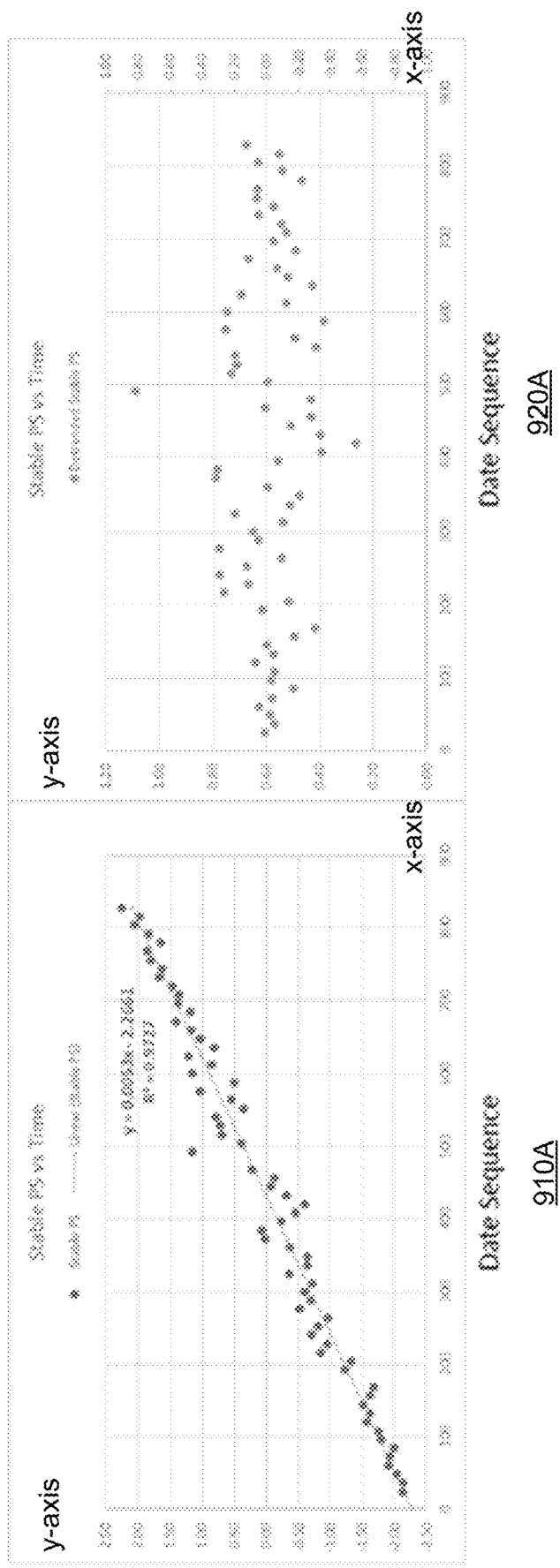
FIG. 9A is an example plot of raw and de-trended stable persistent scatter points, in accordance with some embodiments.

Upon selection of the stable points (e.g., coherence and velocity values), the mean time series trend of those stable points may be plotted and the slope and y-intercept may be calculated. If a significant temporal trend is detected in these stable points, that trend may be removed from all PS points in the data set. For example, FIG. 9A illustrates persistent scatter points over time in a graph 910 and de-trended stable PS points over time in a graph 920. Specifically, the graph 910 plots amount of motion on Y-axis against dates (e.g., number of days passed since the start of a time series) on X-axis. The graph 910 plots the stable points selected above in the graph 910 to generate a mean value for a given date. The graph 910 indicates that the stable points go from a modestly negative value of motion on the Y-axis at the beginning of the time series to a generally positive amount of motion towards the end of the time series. This general positive motion may be indicative of a stable uplift, generally linear trend in the data set (e.g., the stable points selected from Table 1). In some embodiments, the linear trend may be considered an artifact of processing and may be removed.

To remove the artifact, the following formula may be used:

$$y=0.0053x-2.22661$$

Thus, data points on the graph 910 that satisfy the above equation may be de-trended. De-trending of data points may mean that linear regression may be used to deduct a portion of the observed motion that is due to a regional trend or processing error. A correlation coefficient ($R^2$) in the graph 910 may indicate how well a linear regression predicts the y value from the x value in the equation above. A value of $R^2$ that is closer to 1 may mean a good correlation such that the x value in the equation above (e.g., values on the x-axis) better predicts the y value in the equation above (e.g., values on the y-axis). An $R^2$ is closer to 0 may mean that the x value has little predictive capability for that y value. Thus, a high $R^2$ value may indicate strong statistical correlation between time and estimated ground displacement across the region. If the $R^2$ value is high, the data may be de-trended from the graph 910. The de-trended data set is shown in the graph 920. Thus, the graph 920 also plots stable points (with artifact removed) showing amount of motion on Y-axis against dates (e.g., number of days passed since the start of a time series) on X-axis.

Figure 9B:
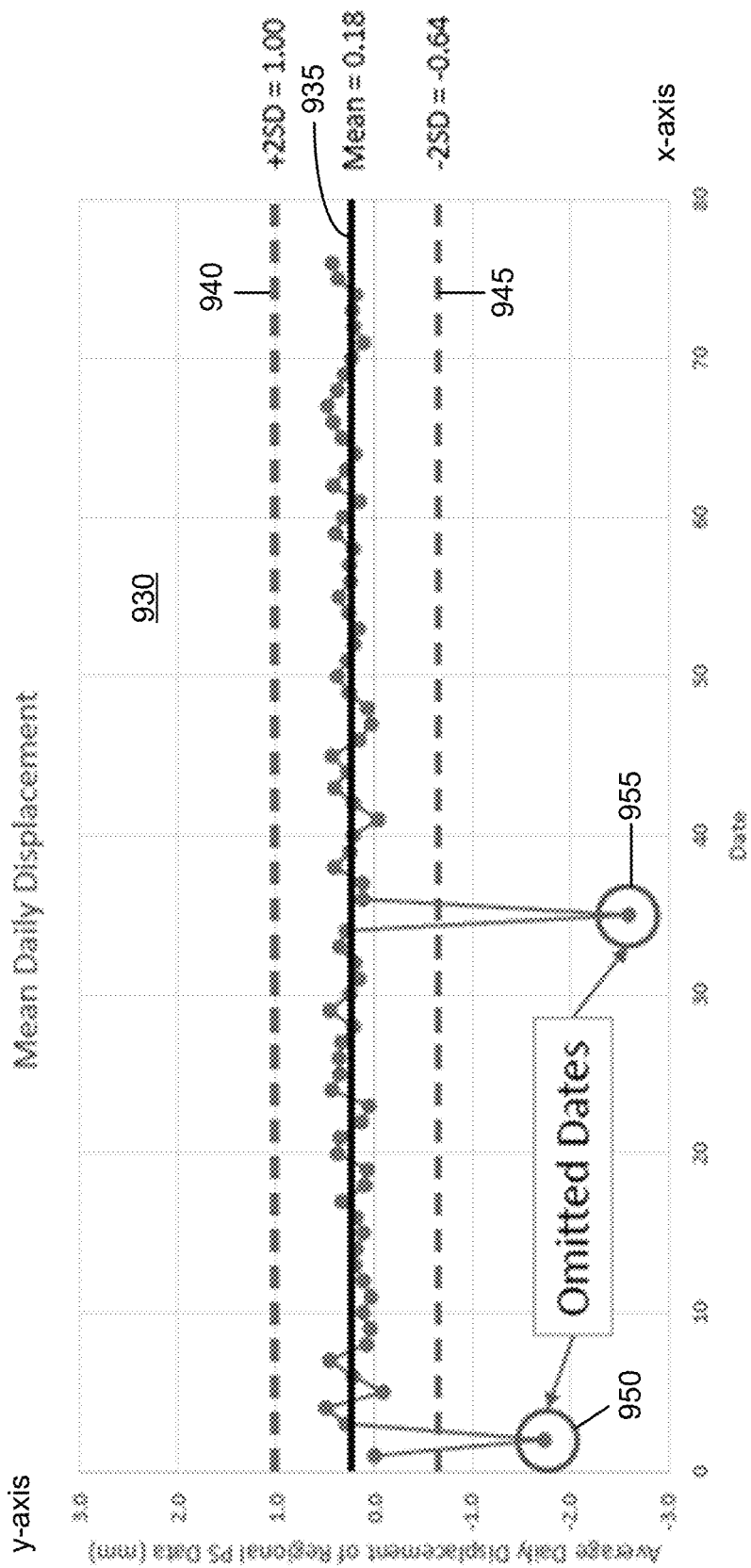
FIG. 9B is an example plot showing removal of atmospheric artifacts, in accordance with some embodiments.

Another issue with raw persistent scatterer data may be the presence of regional atmospheric anomalies characterized by atypical time series values occurring in PS points. In other words, regional atmospheric conditions may cause anomalies in the data set. For example, in some embodiments, temperature or chemical composition of the upper atmosphere may cause anomalous data. Such anomalous data may be removed. FIG. 9B illustrates a graph 930 showing mean daily displacement of atmospheric artifacts. Specifically, the graph 930 plots average daily displacement of regional PS points (e.g., from the Table 1 above) on the Y-axis against dates (e.g., number of days) on the X-axis. Persistent scatterer (PS) points for a particular date are used to compute an average displacement value across all of the PS points for that date. The average displacement values may then be plotted in the graph 930. If an average displacement value has a standard deviation of greater than a particular threshold, that average displacement value may be considered an atmospheric anomaly and data (e.g., PS points) corresponding to that date may be removed. Thus, anomalous dates may be identified by calculating the mean daily displacement of all PS points on a given date and the standard deviation. If the mean daily displacement on a given date is greater than, for example, two standard deviations away from the mean daily displacement, the PS points of that data may be flagged as an atmospheric artifact and removed. Displacement data from anomalous dates may not be used in subsequent analyses. For example, in Table 1 above, the shaded values in the last column may be indicative of atmospheric anomalies and may be removed from the data set.

In the graph 930, majority of the mean daily displacement values are around 0 (e.g., around line 935). Lines 940 and 945 may be indicative of two standard deviations from the line 935. Mean daily displacement values 950 and 955 are greater than two standard deviations away from the average mean (e.g., the line 935). Thus, the PS points corresponding to the date of the mean daily displacement values 950 and 955 may be considered an artifact and removed from further analyses.

Figure 9C:
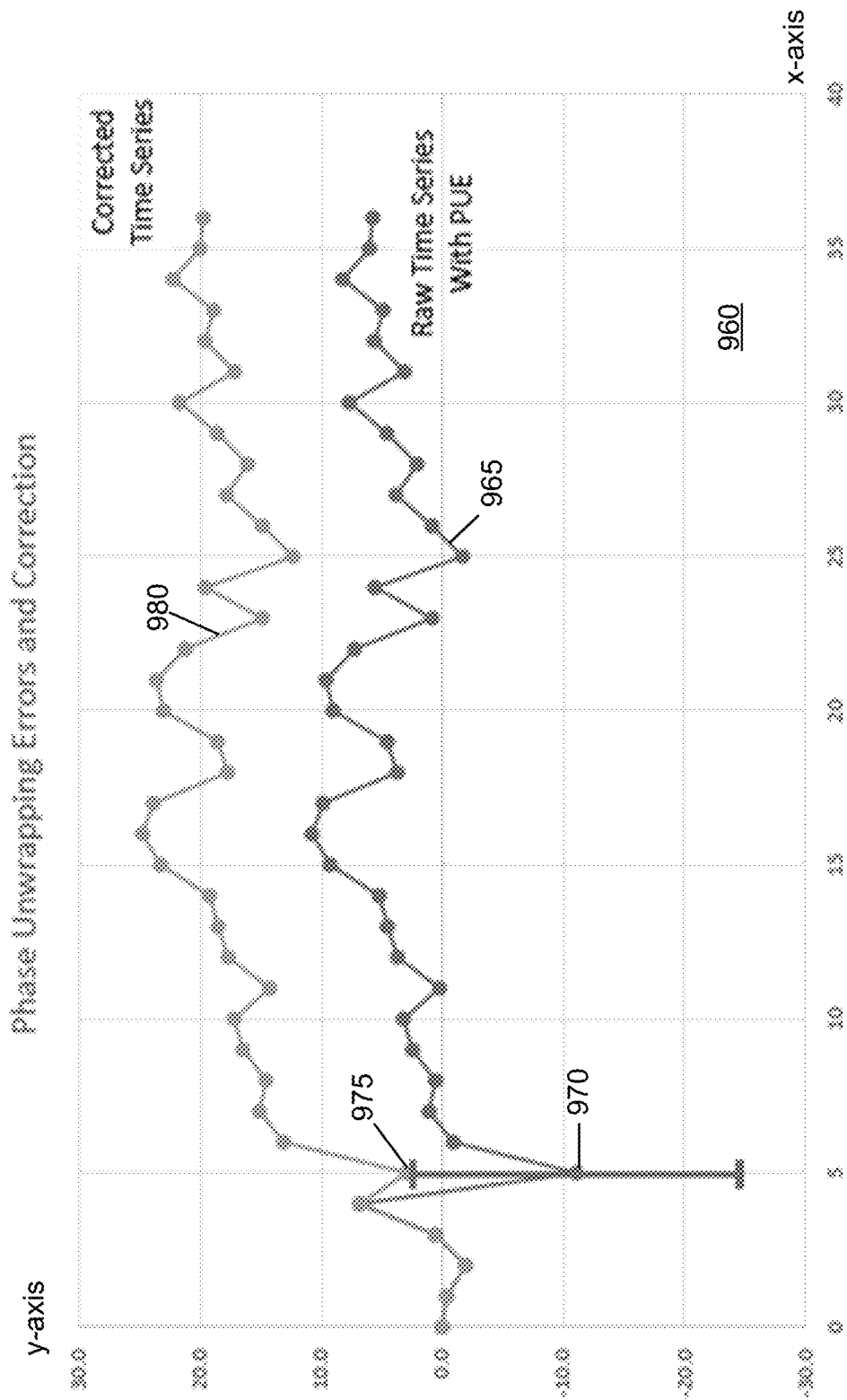
FIG. 9C is an example plot showing identification and correction of phase unwrapping errors, in accordance with some embodiments.

Phase unwrapping errors may be considered processing artifacts that occur when the estimated phase change exceeds a threshold (e.g., one quarter of the sensor wavelength), or in the case of Sentinel 1 (e.g., satellite capturing raw data), a change of +/−14 mm between consecutive SAR acquisition dates. Phase unwrapping errors may occur with lower coherence data. FIG. 9C shows a graph 960 showing identification and correction of phase unwrapping errors. The graph 960 plots PS points from the Table 1 above. X-axis of the graph 960 may be date (e.g., number of days), while the Y-axis may be displacement. PS points that have a displacement of greater/less than a defined threshold may be identified and removed. Thus, errors may be identified using a +/− defined criteria (e.g., +/−14 mm criteria) and corrected by adding the defined value (e.g., 14 mm) to displacement values if the phase unwrapping error is negative or subtracting the defined value (e.g., 14 mm) if the phase unwrapping error is positive. Thus, plot 965 may plot raw PS points. Point 970 of the plot 965 may have a displacement greater than the defined threshold. Thus, the point 970 may be corrected by adding a value (e.g., 14 mm) to the value of the point 970 to obtain point 975 in a corrected plot 980. For example, the shaded values in columns 6 and 7 from the left of Table 1 may be said to have phase unwrapping errors and may be removed. Once completed, the improved or cleaned data (e.g., PS points) may be moved to the next stage of processing.

Figure 10A:
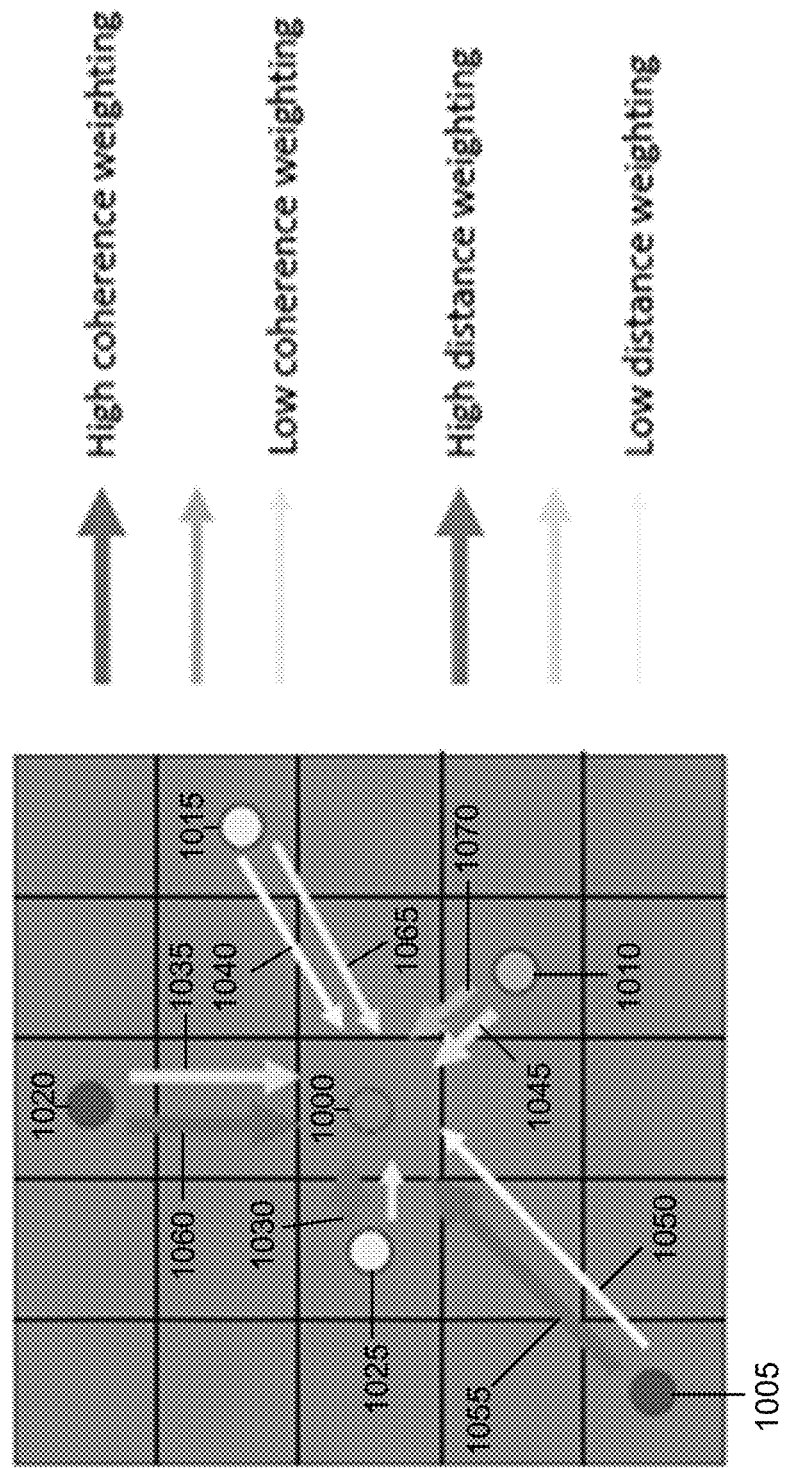
FIG. 10A is an example illustration showing application of a spatial interpolation algorithm, in accordance with some embodiments.
Figure 10B:
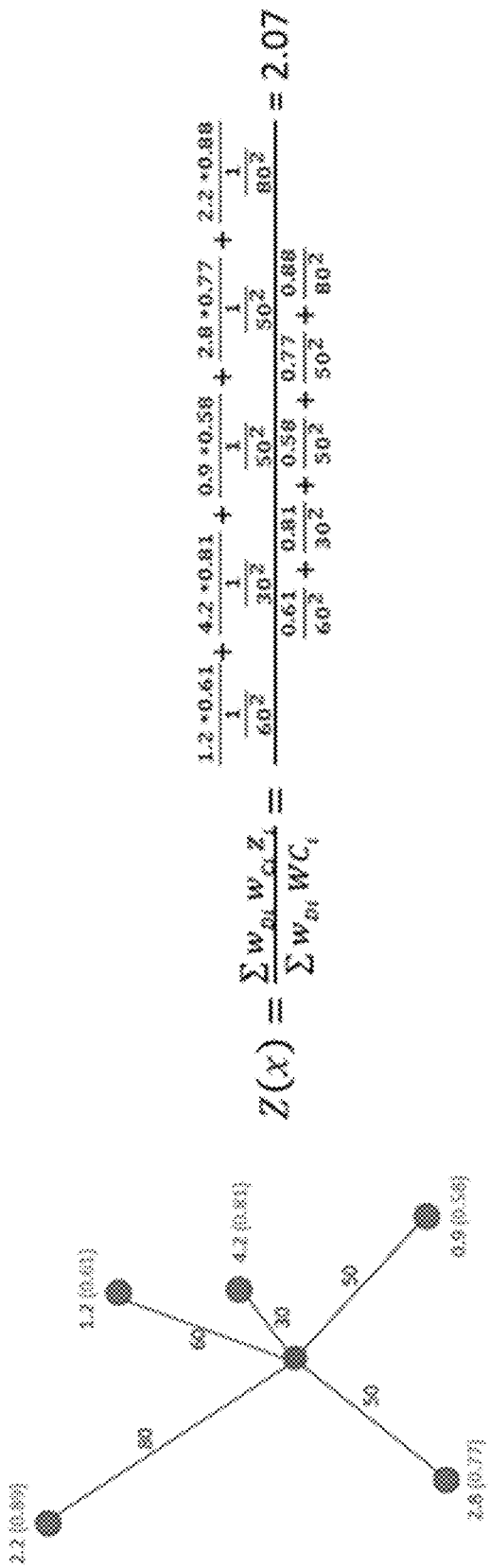
FIG. 10B is an example illustration an example computation of the spatial interpolation algorithm, in accordance with some embodiments.
Figure 10C:
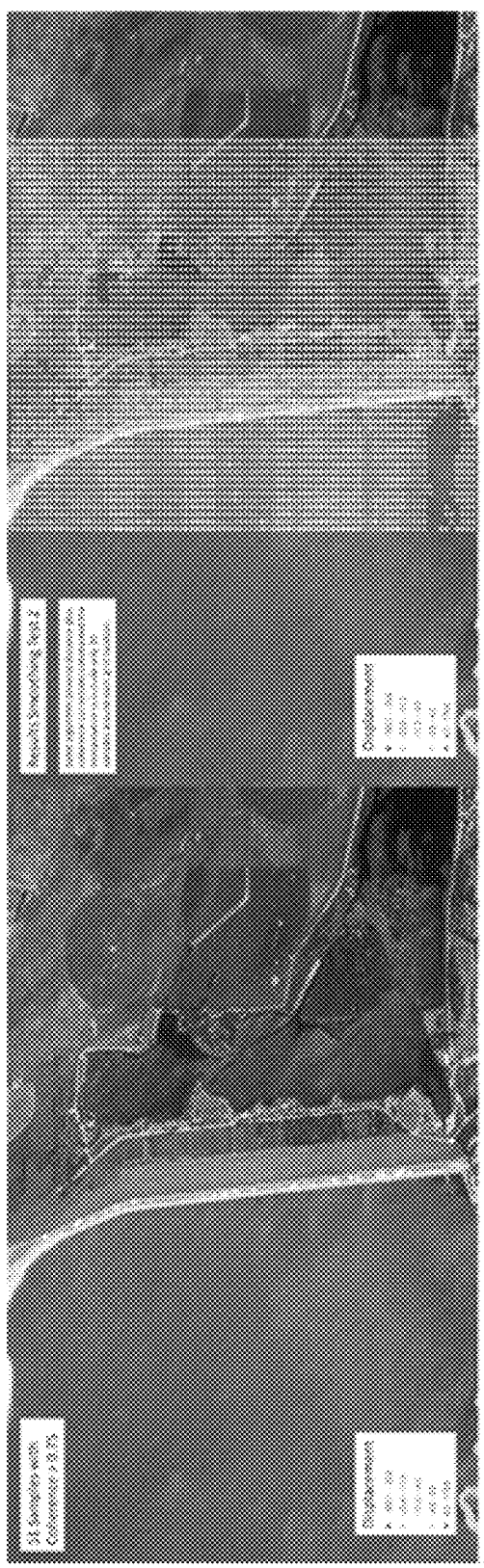
FIG. 10C is an example illustration showing example outputs of the spatial interpolation algorithm, in accordance with some embodiments.

Thus, during the operation 820, the PS points from the Table 1 above may be cleaned to remove three types of errors or anomalies: linear trend artifact, atmospheric anomalies, and phase unwrapping errors. The cleaned data (e.g., cleaned PS points) may then be processed through a spatial interpolation algorithm. Thus, the operation 830 applies a spatial interpolation algorithm to the PS points (e.g., PS-InSAR points) to estimate ground displacement trends in localized areas without these data. This interpolation algorithm uses the distance to neighboring PS-InSAR points and InSAR coherence as weighting factors to interpolate each date's displacement in the SAR time series. It may use a spatially proximate and coherent (e.g., stable persistent scatterers) PS-InSAR points in the local neighborhood to estimate ground motion in areas lacking data. FIGS. 10A and 10B demonstrate the spatial interpolation algorithm and FIG. 10C illustrates a synoptic spatio-temporal coverage for a dam based on the best PS-InSAR data available.

Specifically, the spatial interpolation algorithm may be used to fill in gaps where data does not exist. In some embodiments, these gaps in data may be filled in by using data points of nearby locations. In some embodiments, the data points of the nearby locations may be weighted such that a higher coherence data point may be accorded a higher weight than a relatively lower coherence data point. Similarly, in some embodiments, a distance weighting may be assigned. With distance weighting, data points that are farther away may be accorded a lower weight than data points that are closer. For example, FIG. 10 shows an example of an area of a dam having a missing data point 1000. To determine a value for the missing data point 1000, nearby data points 1005-1025 may be used. Each of the data points 1005-1025 may be a PS point (e.g., cleaned PS point) from the Table 1 above. The missing data point 1000 may be indicative of an area on the ground where a PS data point is not available. The latitude and longitude values (e.g., columns 4 and 5 from the left) from Table 1 above may indicate the area on the ground where data points are available. In some embodiments, it may be desirable to have at least one data point for every predetermined distance in both latitude and longitude. For example, in some embodiments, it may be desirable to have a data point every 15 meters in both longitude and latitude. Thus, if at least one data point every 15 meters is not available, the data points that are missing may be computed using the spatial interpolation algorithm. For example, if a data point is available at Meter 0 and Meter 30, then a data point may be considered missing for Meter 15, which may then be computed using the spatial interpolation algorithm.

To compute the missing data point 1000, a predetermined number of nearby data points may be selected. In some embodiments, the nearby data points may be selected based on a predefined criteria. For example, in some embodiments, data points that are separated from the missing data point 1000 by less than a predetermined distance may be considered as the nearby data points. In other embodiments, other criteria may be used to select a predetermined number of nearby data points from Table 1 above (upon data cleaning). For each selected nearby data point (e.g., the data points 1005-1025), the distance between that data point and the missing data point 1000 may be computed. For example, if the missing data point 1000 corresponds to a latitude/longitude of X and the data point 1010 corresponds to a latitude/longitude of Y (as determined from Table 1 above), the difference between Y and X (e.g., Y−X) may determine the distance between the data point 1010 and the missing data point. Similarly, a distance may be computed between each of the data points 1005-1025 and the missing data point 1000. Based upon the distance, each of the data points 1005-1025 may be accorded a weight.

The farther a data point from the missing data point 1000, the lower is the distance weight of that data point. For example, the data point 1025 is the closest in distance to the missing data point 1000. Thus, the data point 1025 may be accorded a highest distance weighting, as indicated by arrow 1030. The thickness of arrows 1030-1050 may indicate the distance weighting in FIG. 10A. The thicker the arrow, the higher is the distance weighting. In addition to distance weighting, each of the data points 1005-1025 may be accorded a coherence weighting. Each of the data points 1005-1025 may have a coherence value, as seen from Table 1 above. The coherence weighting may be based on the coherence value of a particular data point. Threshold values that define a sliding scale of "high coherence" to "low coherence" may be defined. Based on these threshold values, each of the data points 1005-1025 may be accorded a weight. A higher coherence value may be accorded a greater weight than a lower coherence value. For example, the data points 1005 and 1020 may have a high coherence value and may be accorded a higher coherence weighting, as indicated in FIG. 10A by thicker arrows 1055 and 1060. The data point 1015 may have a low coherence value and may be assigned a low coherence weighting as indicated by a thin arrow 1065. The data point 1010 has a thickness of arrow 1070 that is less than the thickness of the arrows 1055 and 1060, but more than the thickness of the arrow 1065, indicating that the data point 1010 has a coherence value between high and low, and therefore, may be accorded a coherence weighting that is between the coherence weightings of the data points 1005/1020 and 1015.

Thus, for each nearby data point, a coherence weighting and a distance weighting may be computed. Based upon these weighting, a displacement value may be computed for the missing data point 1000 using the following formula:

$$Z(x) = \frac{\sum w_{pi} w_{ci} z_i}{\sum w_{pi} W_{ci}}$$

In the formula above, $W_{Di}$ is the distance weighting and $W_{Ci}$ is the coherence weighting of a data point, $Z_i$. $Z(x)$ is the computed value of the missing data point 1000. FIG. 10B shows an example of how the displacement value of the missing data point 1000 may be computed using the formula above. An example of a portion of a dam site with the missing data points filled in using the spatial interpolation algorithm is shown in FIG. 10C. The left side image in FIG. 10C shows a portion of a dam site with data points missing, while the image on the right side of FIG. 10C shows the same portion of the dam site with the missing data points computed using nearby data points, as discussed above.

At the operation 840, a time series analysis is performed to rapidly calculate a number of diagnostic statistical parameters for each time PS-InSAR data point using the following equations:

$$\text{Velocity}\left(\frac{mm}{\text{year}}\right) = \frac{(Disp._{T_n} - Disp._{T_0})}{T_n - T_0} * \frac{365 \text{ days}}{1 \text{ year}} \quad \text{Equation (1)}$$

Where $Disp._{T_n}$ is displacement at time n, $Disp._{T_0}$ is displacement at time 0

$$R^2 = 1 - \frac{\text{Sum Squared Regression}(SSR)}{\text{Total Sum of Squares}(TSS)} = 1 - \frac{\sum(y_i - \hat{y}_i)^2}{\sum(y_i - \bar{y}_i)^2} \quad \text{Equation (2)}$$

$$RMSE = \sqrt{\frac{\sum_{i=1}^{N}(x_i - X_i)^2}{N}} \quad \text{Equation (3)}$$

$$\text{Seasonality index} = (Y/T*C*I)*100 \quad \text{Equation (4)}$$

Where Y is the actual time series value, T is the trend value, C is the cyclical value and I is the irregular (noise value) for the time series.

$$\text{Amplitude} = \frac{y}{\sin\left(\frac{2\pi}{\tau} - t\right)} \quad \text{Equation (5)}$$

Where $\tau$ is the period and t is time $$\text{Strength of Trend} = \max\left(0, 1 - \frac{Var(R_t)}{Var(T_t + R_t)}\right) \quad \text{Equation (6)}$$

Where $T_t$ is the smoothed trend component, $S_t$ is the seasonal component and $R_t$ is the remainder component.

$$\text{slope} = \beta^*(\ell_t - \ell_{t-1}) + (1+\beta^*)b_{t-1} \quad \text{Equation (7):}$$

Where $\ell_t$ is the estimate of the level of the time series at the time t, $b_t$ is the estimate of the slope of the time series at time t and $\beta^*$ is a smoothing parameter.

$$\hat{\beta} = (X^T X)^{-1} X^T \bar{y} \quad \text{Equation (8):}$$

Where $\hat{\beta}$ is the estimated regression polynomial coefficient (the quadratic coefficient used as the curvature index) and $X^T$ is a Vandermonde matrix.

$$\text{A change point is detected if } \lambda > c \quad \text{Equation (9):}$$

Where $\lambda = 2[\mathcal{L} - \log f(x|\hat{\theta})]$

And $\mathcal{L} = \max_k [\log f(x_1, \ldots, x_k|\hat{\theta}_2) + \log f(x_{1+1}, \ldots, x_n|\hat{\theta}_2)]$ Where f is a probability density function of x, and $\hat{\theta}$ is the maximum likelihood estimate based on x. c is a selected statistical threshold of $\lambda$.

In some embodiments, the following time series metrics may be used, as indicated in the equations above:

Velocity: The mean annual velocity in millimeters/year (Equation 1).

R2: Correlation coefficient of determination of the linear regression (Equation 2).

RMSE: Root mean square error of the linear regression (Equation 3).

Seasonality: The annual periodicity index (Equation 4).

Amp: The amplitude or total height of the annual component of the time series (Equation 5).

T_Str: Trend strength as defined by Wang et al. 2006 (Equation 6).

T_Dir: Trend direction (negative to positive) as defined by Wang et al. 2006 (Equation 7).

T_Cur: Trend curvature based on the coefficients of an orthogonal quadratic regression (Equation 8).

TSClass: The time series pattern classification (0=no trend, 1=linear, 2=interrupted time series) based on a test of significance of the linear regression term.

CPindex: A change point index (e.g. Killick and Eckley, 2014) (Equation 9).

Changedate: Date of the significant change point.

Pre_CP: Annual velocity before the change point date.

Post_CP: Annual velocity after the change point date.

The above time series analysis may be referred to herein as a TeMPEST (Temporal Motion Pattern Examination and Statistical Tools) analysis. The TeMPEST analysis may be used to review the time series of each data point from the cleaned values of the Table 1 above and calculate a number of metrics described above. An example of the computed metrics values are shown in Table 2 below:

TABLE 2

| ID | X | Y | Velocity | R2 | RAISE | Seasonality | Amp |
|---|---|---|---|---|---|---|---|
| 11 | 13.36574 | −2.6975 | −2.8136 | 0.3952 | 2.3472 | 0.6824 | 0.5590 |
| 12 | 13.36581 | −2.6954 | −2.6204 | 0.5852 | 2.2326 | 0.7699 | 0.6065 |
| 13 | 13.36588 | −2.6933 | 0.6378 | 0.4551 | 1.9465 | 0.7960 | 0.7786 |
| 14 | 13.36595 | −2.6912 | −1.9939 | 0.6306 | 1.9136 | 0.8109 | 0.7821 |
| 15 | 13.36602 | −2.6891 | −1.0799 | 0.3509 | 1.9075 | 0.8149 | 0.7705 |
| 16 | 13.36609 | −2.687 | −0.9947 | 0.1258 | 1.9353 | 0.7853 | 0.7351 |
| 17 | 13.36616 | −2.6849 | −1.9428 | 0.3015 | 1.9942 | 0.7678 | 0.7196 |
| 18 | 13.36623 | −2.6828 | 3.0297 | 0.5100 | 2.0423 | 0.7815 | 0.7202 |

TABLE 2-continued

| ID | X | Y | | | | |
|----|---|---|---|---|---|---|
| 19 | 13.36630 | −2.6807 | −2.1401 | 0.4216 | 2.0963 | 0.8010 | 0.7313 |
| 20 | 13.36637 | −2.6786 | −0.2792 | 0.3383 | 2.1497 | 0.8232 | 0.7633 |
| 21 | 13.36644 | −2.6765 | −0.5155 | 0.3733 | 2.1979 | 0.8521 | 0.8097 |
| 22 | 13.36651 | −2.6744 | −2.7929 | 0.4140 | 2.2409 | 0.8650 | 0.8813 |
| 23 | 13.36658 | −2.6723 | 1.8274 | 0.4243 | 2.2212 | 0.8650 | 0.8886 |

| T_Str | T_Dir | T_Cur | TSClass | Cpindex | Changedate | preCP | postCP |
|-------|-------|-------|---------|---------|------------|-------|--------|
| 0.75 | 30.0 | 0.31 | 1 | 0 | None | n/a | n/a |
| 0.56 | 27.0 | −0.87 | 1 | 0 | None | n/a | n/a |
| 0.75 | 9.0 | −0.09 | 0 | 0 | None | n/a | n/a |
| 0.62 | 0.0 | −0.26 | 1 | 0 | None | n/a | n/a |
| 0.34 | −21.0 | 0.57 | 0 | 0 | None | n/a | n/a |
| 0.75 | −15.0 | −.078 | 0 | 0 | None | n/a | n/a |
| 0.10 | 27.0 | 0.42 | 0 | 0 | None | n/a | n/a |
| 0.33 | 19.0 | −0.5 | 1 | 0 | None | n/a | n/a |
| 0.15 | 37.0 | −1.5 | 1 | 0 | None | n/a | n/a |
| 0.41 | 28.0 | −0.49 | 0 | 0 | None | n/a | n/a |
| 0.04 | −38.0 | −0.74 | 0 | 0 | None | n/a | n/a |
| 0.86 | 47.0 | −1.07 | 0 | 1 | None | −3.8854 | −1.0558 |
| 0.86 | −30.0 | 1.02 | 0 | 0 | None | n/a | n/a |

The first column (ID) in Table 2 above may be a unique identifier assigned to each data point, the second column (X) may be the latitude of a data point and the third column (Y) may be the longitude of the data point. The remaining columns may correspond to the metrics computed above. Thus, each row in Table 2 may be considered one data point. The metrics computed using the TeMPEST analysis may then be used for a spatio-temporal clustering at the operation 850. The spatio-temporal clustering of the TeMPEST metrics in Table 2 above may be used to find localized clusters of PS-InSAR points whose general history of movement are temporally similar and within a set distance (e.g. 30 meters) from one another.

Figure 11:
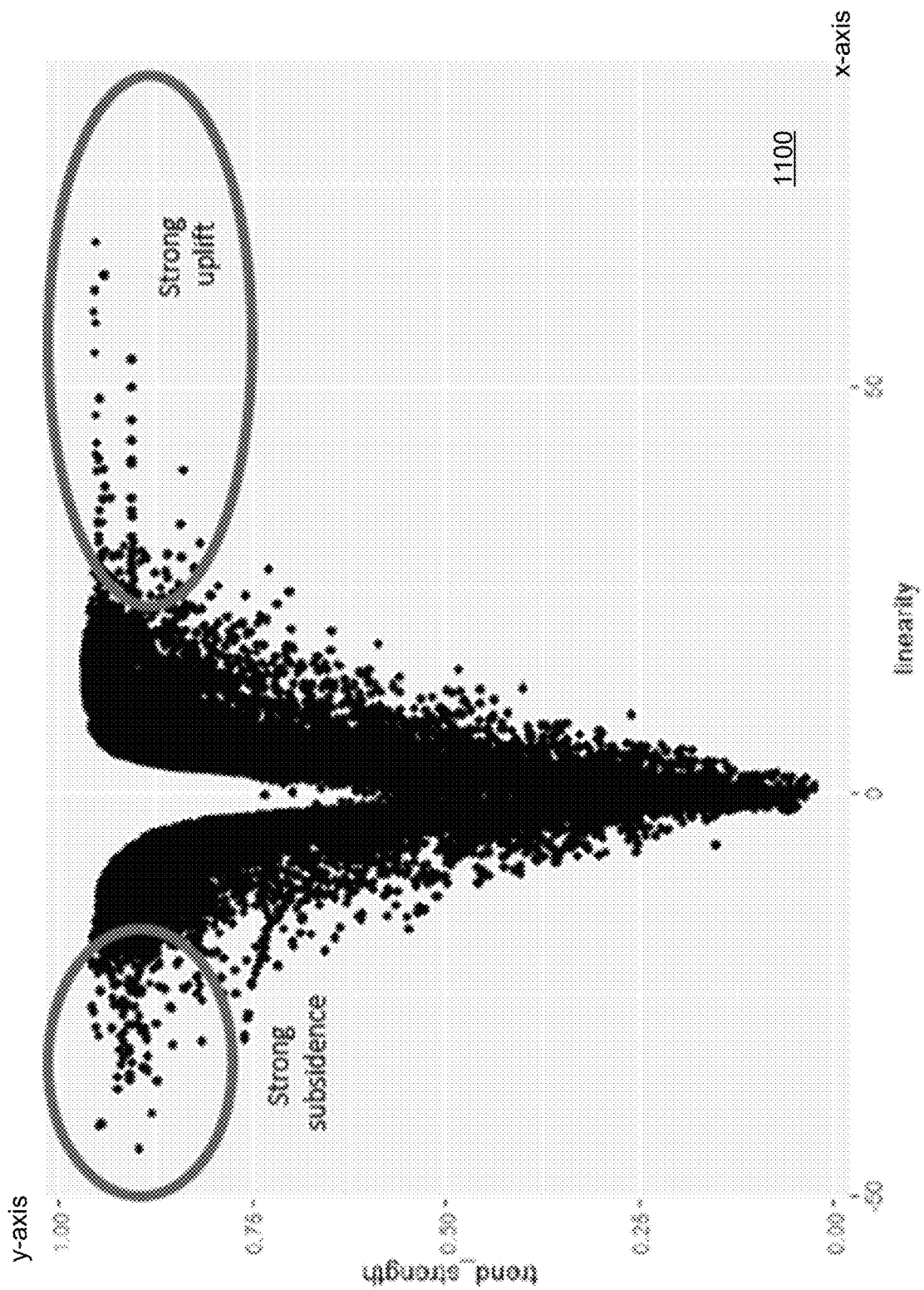
FIG. 11 is an example plot showing clusters of selected temporal motion pattern examination and statistical tools metrics, in accordance with some embodiments.

To perform the spatio-temporal clustering, the process 800 may search for groups of data points that share similar trend strength and direction, as shown in FIG. 11, where data points that are strongly linear (e.g., statistically significant slopes of similar magnitude) and exhibiting a negative slope direction (e.g., subsidence) may belong to the same temporal group. Referring to FIG. 11 in conjunction with FIG. 8, a graph 1100 may plot data points from Table 2 above. The X-axis may indicate linearity, while Y-axis may indicate trend strength in the graph 1100. From the graph 1100, it may be seen that the majority of the data points exhibit a similar trend in terms of strength and direction (e.g., linearity). Further, these data points may be close to each other in distance (e.g., within 30 meters of each other). These data points may be indicative of dam areas that may potentially have experienced ground motion and may need to be flagged.

Figure 12:
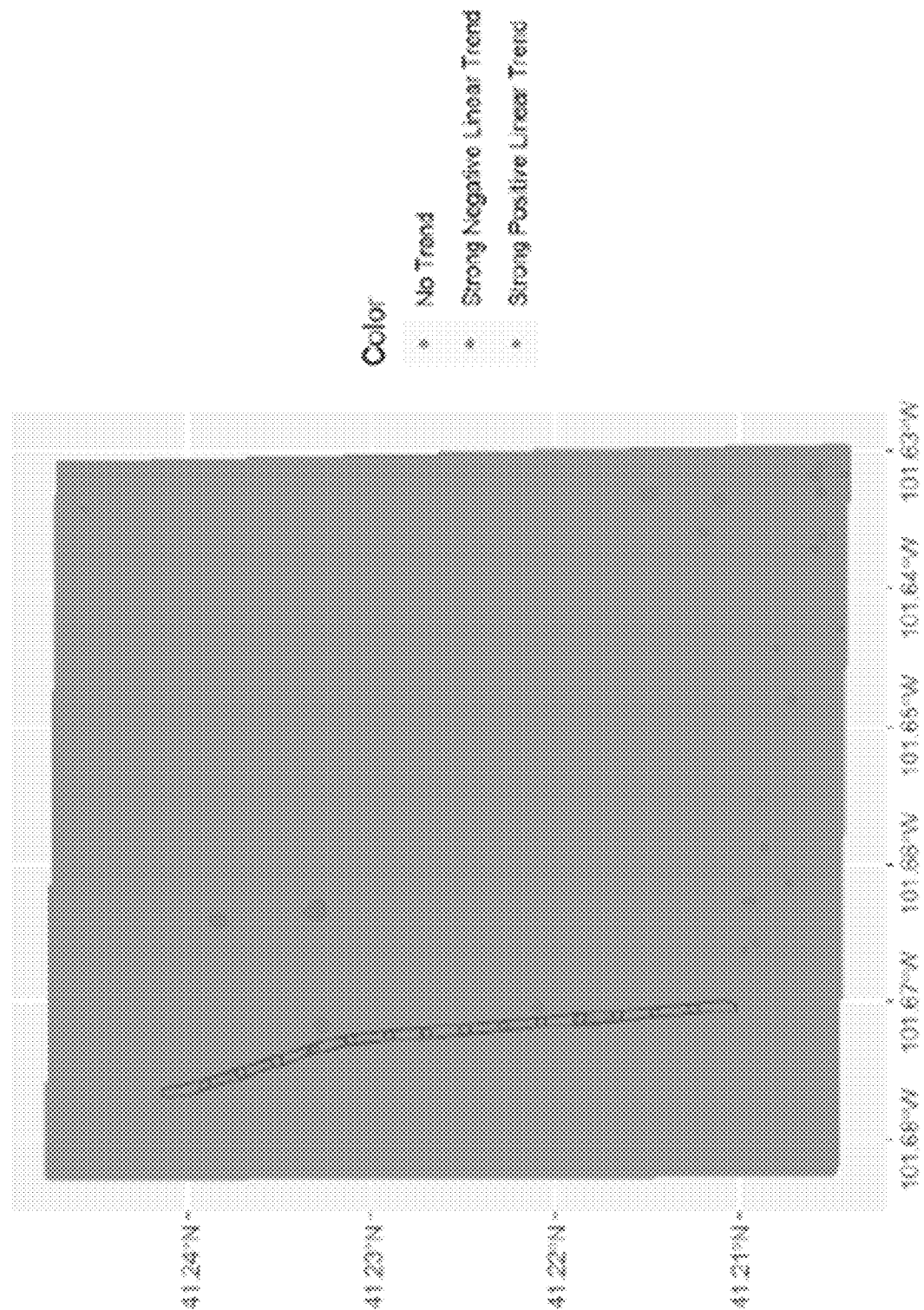
FIG. 12 is an example plot showing outputs from a dam motion analysis with identified dam exhibiting settlement, in accordance with some embodiments.

At the operation 850, the process 800 may also determine if there are any spatial groups of the temporally clustered points by using a defined (e.g., 30 meters) maximum separation distance. If the distances of three or more data points, that for example are linear (e.g., strongly linear) and have a negative slope, are less than 30 meters away from each other, then they may be considered a Dam Motion Areas (DMA's) indicating a possible structural or ground motion. (e.g., see FIG. 12). Thus, by spatio-temporal clustering, the process 800 may identify one or more temporal groups (e.g., groups having linear trend with a negative slope) and/or one or more spatial groups (e.g., data points separated by no more than a defined distance). The temporal and/or spatial groups may be indicative of a dam motion area. For example, in FIG. 11, the portions of the graph 1100 identified as having strong subsidence and strong uplift may be considered dam motion areas. In an example implementation, the process 800 uses trend strength and direction to form the temporal clusters, however, the process may also use trend curvature and/or seasonal periodicity in some embodiments.

Figure 13A:
FIG. 13A is an example of output showing mean seasonality of dam segments, in accordance with some embodiments.
Figure 13B:
FIG. 13B is an example of output showing mean velocity of dam segments, in accordance with some embodiments.
Figure 13C:
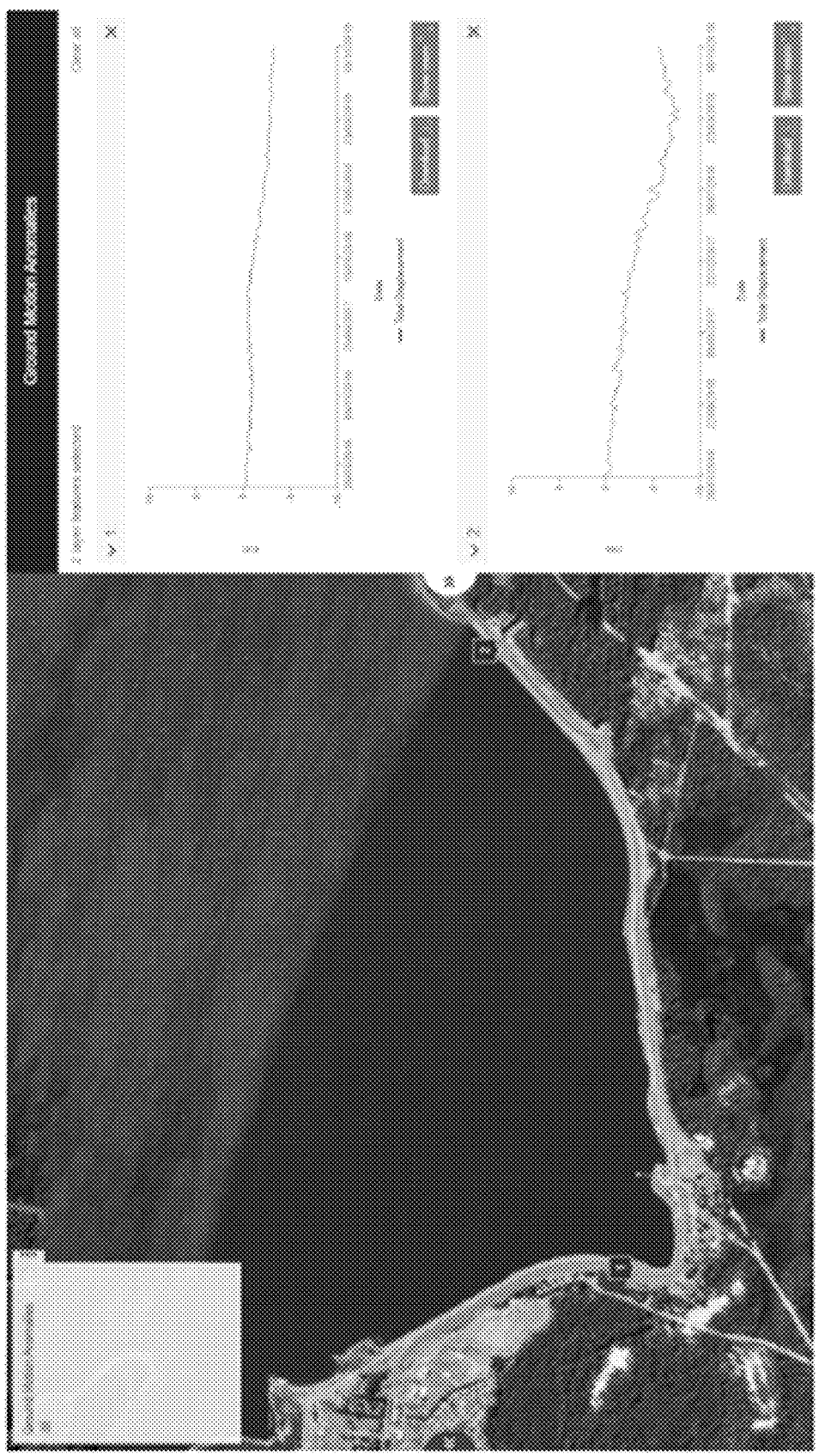
FIG. 13C is an example of output showing dam motion areas and motion histories, in accordance with some embodiments.

The operation 860 may output a time series data for dam segments describing the vertical motion history specific to that section of a dam (e.g., the data of the operations 810-840), as shown in FIG. 13A and FIG. 13B. The output of the process 800 may also include, as shown in FIG. 13C, dam motion areas that employ objective numerical criteria and expert rules to identify specific areas of a dam site that demonstrate statically unusual dynamics (e.g., the temporal and spatial clusters of the operation 850), and monthly updates to motion histories of the dam site that use outlier detection algorithms to alert dam managers to suspicious dam behavior.

Monthly updates may include combining current data (e.g., current PS-InSAR data points) with historical data (e.g., historical PS-InSAR data points over a month) to update time series of ground motion. In some embodiments, the current and historical data may be analyzed to determine overall round motion trends over a period of time. Such an analysis may determine "typical" range of ground motion for a given month. The outlier detection algorithm may use the "typical" ground motion to determine a probability of a future month's displacement being typical or anomalous. Similar updates may be performed on a yearly basis or at other time intervals.

The outlier detection algorithm may analyze new data to determine the amount of displacement being shown for that particular time period. The outlier detection algorithm may compare the current data against the range of values observed at similar times within the longer time series. For example, if a new data point is available for October 2020, the outlier detection algorithm may compare the ground motion results from October 2020 with the ground motion results from October time periods for 2019, 2018 and 2017, and so on to determine typical ground motion range values for October. If the October 2020 ground motion values are within the range values, the process 800 may determine that the October 2020 ground motion values are not an outlier. However, if the October 2020 are near the extremes of those ranges or outside of those ranges, then it may be determined that the range motion in October 2020 is outside of normal values and possibly need further review (e.g., manual review).

Figure 14:
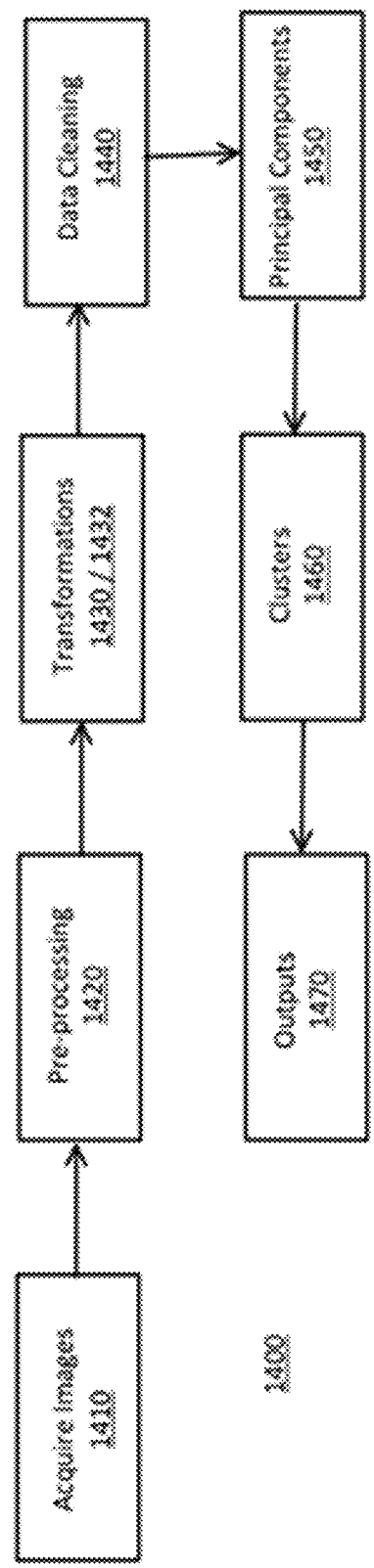
FIG. 14 is an example flow diagram outlining operations performed in an anomalous vegetation area workflow, in accordance with some embodiments.

FIG. 14 illustrates a process 1400 of operations performed in an anomalous vegetation area workflow. Additional, fewer, or different operations may be performed in method 1400 depending on the embodiment. Anomalous Vegetation Areas (AVAs) and Anomalous Wetness Areas (AWAs) may be considered indicators of embankment seepage, a symptom of underlying stability changes within embankments. Specifically, AVA may be considered an indication of greenness and AWA may be indicative of wetness. Either excessive greenness or wetness may be indicative of anomalous vegetation vigor, and therefore, water seepage. The process 1400, thus, uses indices of vegetation vigor and leaf water moisture as surrogates for embankment seepage. Areas of unusually high vegetation vigor and/or leaf water moisture might indicate consistently wet soils associated with seepage. Images are acquired (operation 1410), pre-processed (operation 1420), and transformed (operations 1430 and 1432). Data is cleaned (operation 1440), a principal components analysis is conducted (operation 1450), results are clustered (operation 1460), and outputs are provided (operation 1470).

Figure 15:
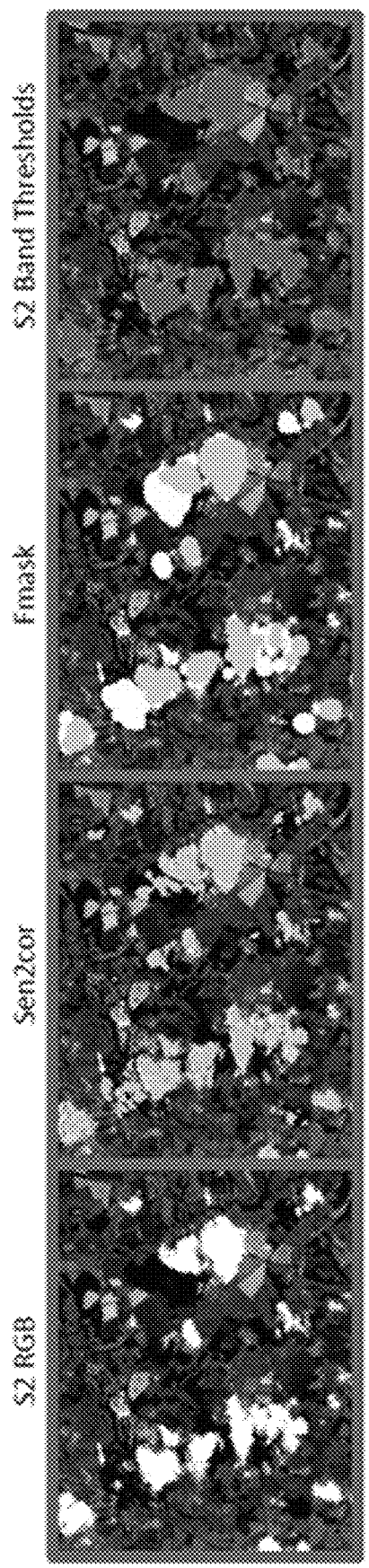
FIG. 15 is an example of cloud masking, in accordance with some embodiments.

The operation 1410 includes acquisition of a series of images (e.g., optical imagery) within a defined period. For example, in some embodiments, the operation 1410 may acquire a two-year time series of Sentinel 2 multispectral imagery. The imagery may be acquired in any suitable fashion. The acquired images may be co-registered. In other words, at the operation 1420, the acquired images may be co-registered to precisely align the pixels of a Sentinel 2 image to counterparts in subsequent Sentinel 2 acquisitions. Without the co-registration process, the resulting data may be noisy or erroneous. The co-registration may be performed as discussed above in FIG. 1. Next, the process 1400 harmonizes the radiometric data from each image acquisition through the removal of atmospheric contamination. This process may be accomplished through a software package such as "Sen2cor" distributed by the European Space Agency and using the global default parameters. The last part of the pre-processing phase of the workflow is the removal of clouds, cloud shadow and haze in each image as these phenomena produce anomalous vegetation metrics that confound subsequent analyses. Software packages such as "Sen2cor" and "Fmask" may be used. Software packages identify pixels affected by cloud, cloud shadow and haze but the algorithms and processing steps differ thus producing varying spatial extents of affected areas. The method may also use a third cloud-screening approach (e.g., S2RGB) based on empirically-derived thresholds of two of Sentinel 2's thirteen bands to create a third set of pixels identified as cloud, cloud shadow and haze. FIG. 15 shows the merging of the three sets (one set obtained from each "Sen2cor," "Fmask," and "S2RGB") of "flagged" pixels including a buffer of a distance of 100 metres to remove cloud artifacts from the Sentinel 2 data sets prior to subsequent analyses.

The operations 1430 and 1432 use a Tasseled Cap (TC) transformation, specifically tuned to Sentinel 2 MSI imagery to reduce the dimensionality of the Sentinel 2 multispectral imagery from thirteen to three bands. A Tasseled Cap transformation is a series of coefficients that may be applied against each of the significant bands for an S2 image to reduce the complexity of a scene in an image. The first Tasseled Cap band may be associated with soil brightness. The second and third Tasseled Cap bands may be related to chlorophyll concentration (green-ness) and leaf water content (wet-ness) in vegetation and form the primary aspects of vegetation that are examined in subsequent steps below. Thus, a Tasseled Cap band for greenness and a Tasseled Cap band for wetness may be used below.

The operation 1440 involves data cleaning. Despite the Sentinel 2 pre-processing described earlier (the operation 1420), small amounts of cloud, cloud shadow and haze remain in the time series of Tasseled Cap indices that require further data cleaning prior to analysis. Furthermore, the cloud screening process may result in spatial and temporal data gaps that may need to be identified and rectified. Anomalously large or small vegetation metric values result from cloud contamination may be identified through outlier analysis and time series change points. Once identified, these Tasseled Cap values may be discarded. Temporal data gaps may be filled using a four-interval temporal moving average for each pixel location or using three Tasseled Cap values surrounding the data gaps to estimate its value, as shown in the graph of FIG. 16.

Figure 16:
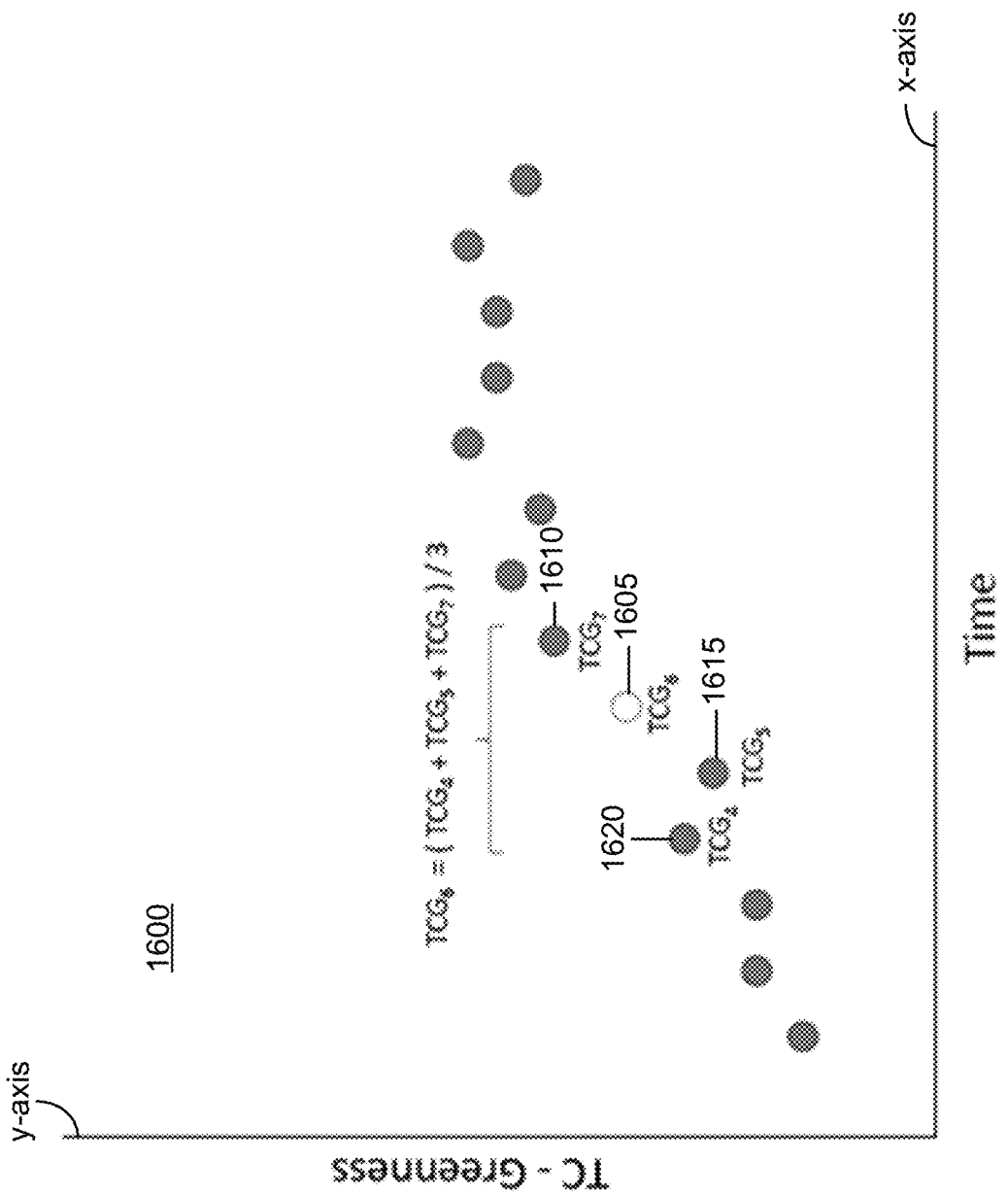
FIG. 16 is an example plot showing temporal gap filling via moving window average for Tasseled Cap greenness, in accordance with some embodiments.

Specifically, FIG. 16 shows a graph 1600 that plots time on X-axis against Tasseled Cap greenness on the Y-axis. Tasseled Cap data point 1605 is shown missing. The graph 1600 may be used to compute a Tasseled Cap value for the data point 1605. In some embodiments, the Tasseled Cap value for the data point 1605 may be computed by determining an average of nearby data points. For example and as shown in FIG. 16, the Tasseled Cap value for the data point 1605 may be computed by determining an average of data points 1610-1620 that are closest to the data point 1605. The number of nearby data points that may be used to compute the average for the data point 1605 may vary in some other embodiments. Similar missing data point values may be determined for Tasseled Cap wetness values.

The operation 1450 involves a Principal Component Analysis (PCA) to identify points of significance over the whole time series. A PCA analysis may be performed for greenness and a PCA analysis may be performed for wetness. PCA is a technique to reduce the complexity of high dimensional data to a manageable and easily visualized level, while retaining the dataset's defining characteristics. Each date represents one dimension of greenness and wetness datasets. Using this approach, a large proportion of the variance in a multi-temporal data set comprising 150+ dates of imagery can be compressed to one Principal Component that explains between 50-70% of the time series variance. To identify "anomalous vegetation, a +/−2 standard deviation (SD) threshold of the PC1 eigenvalues may be used where points with an eigenvalue greater the +2SD or less than −2SD from the mean may be flagged, as shown in FIG. 17.

Figure 17:
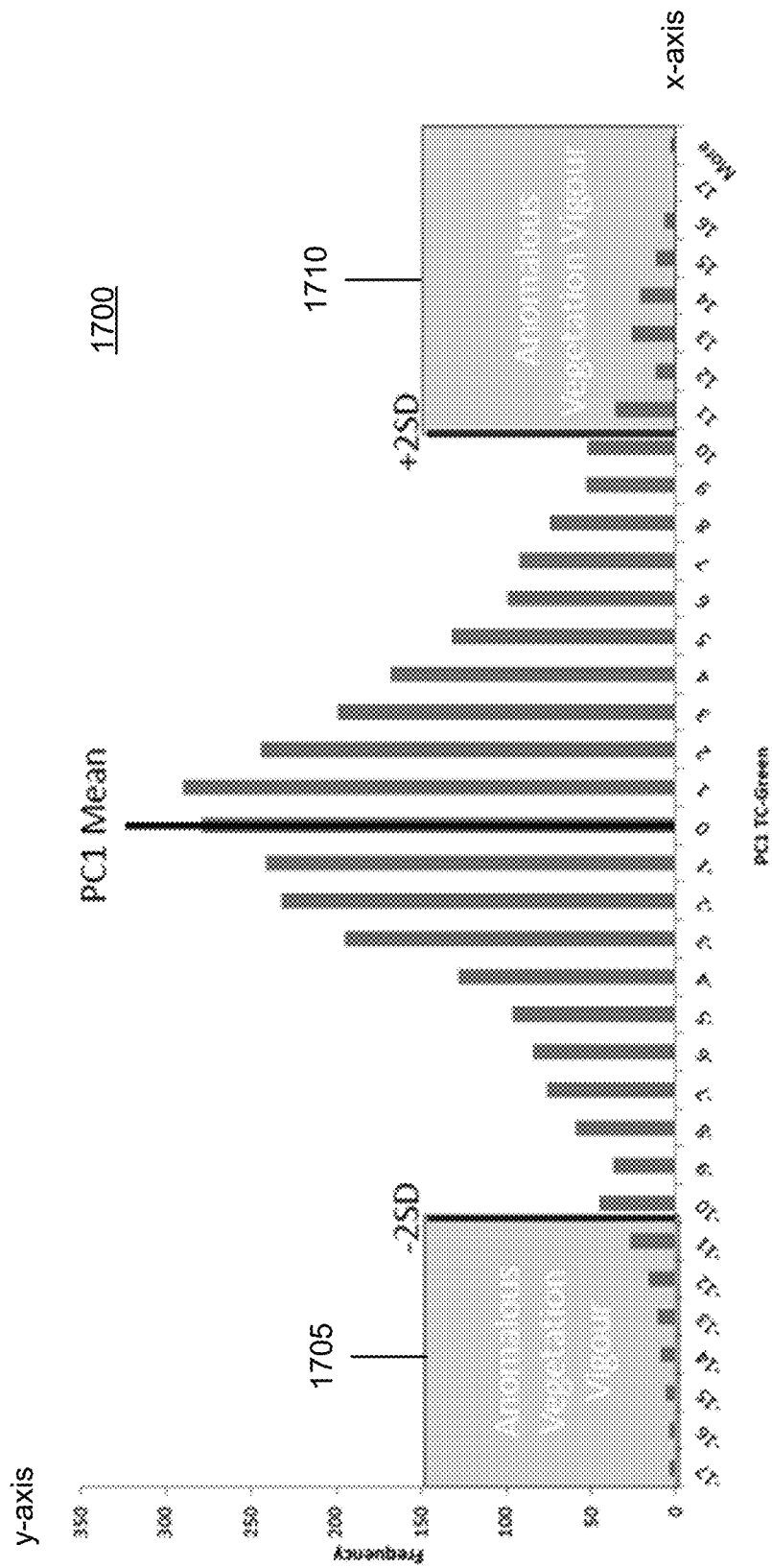
FIG. 17 is a graph showing a histogram of the first Principal Component eigenvalues for Tasseled Cap greenness, in accordance with some embodiments.

FIG. 17 shows a graph 1700 that plots the first PCA component of Tasseled Cap greenness on the X-axis against a frequency on the Y-axis. Each "bar" on the graph 1700 corresponds to a location on the ground and may be associated with an item value that may vary between −17 or +17. The values that sit closer to zero on the X-axis are indicative of normal or expected greenness. As the values move further away from zero, whether in the positive values going above, say 10, or the negative values, say below −10, these values may indicate abnormal behavior. For example, in the graph 1700, values in the box 1705 and 1710 may indicate a standard deviation of +/−2SD and may be considered anomalous and may be flagged. Similar anomalous indications may be determined for wetness, not shown.

Figure 18:
FIG. 18 is an example of output showing anomalous vegetation areas, in accordance with some embodiments.

At the operation 1460, points on the embankment that are statistically significant are identified, which are defined as those above (high) or below (low) 2-standard deviations from the mean (FIG. 11). Where these statistically significant points are clustered, or 3 or more points within 30 meters of each other, their statistics are aggregated into a polygon and labelled "anomalous" and op at the operation 1470. Single significant points or groups of two significant points may be discarded. FIG. 18 is an example of output showing anomalous vegetation areas 1800, 1805, and 1810 in accordance with some embodiments.

Figure 19:
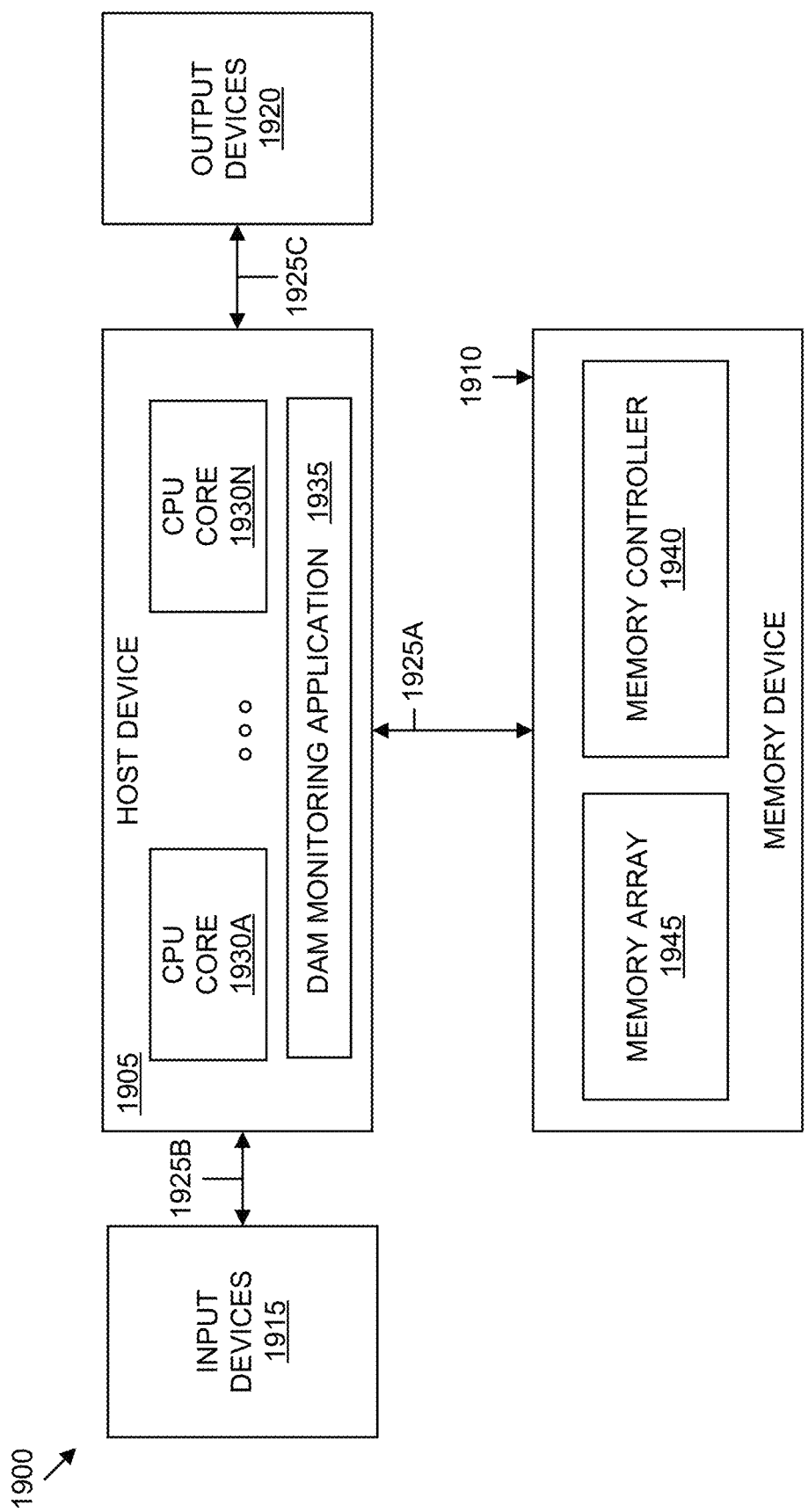
FIG. 19 is an example computing system for performing the dam monitoring analysis of FIGS. 1-18, in accordance with some embodiments.

Referring now to FIG. 19, an example block diagram of a computing system 1900 is shown, in accordance with some embodiments of the disclosure. The computing system 1900 may be used for performing dam monitoring analysis discussed above in FIGS. 1-18. The computing system 1900 includes a host device 1905 associated with a memory device 1910. The host device 1905 may be configured to receive input from one or more input devices 1915 and provide output to one or more output devices 1920. The host device 1905 may be configured to communicate with the memory device 1910, the input devices 1915, and the output devices 1920 via appropriate interfaces 1925A, 1925B, and 1925C, respectively. The computing system 1900 may be implemented in a variety of computing devices such as computers (e.g., desktop, laptop, servers, data centers, etc.), tablets, personal digital assistants, mobile devices, other handheld or portable devices, or any other computing unit suitable for performing the dam monitoring analysis using the host device 1905.

The input devices 1915 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 1920 may include a variety of output technologies such as external memories, printers, speakers, displays, microphones, light emitting diodes, headphones, video devices, and any other output peripherals that are configured to receive information (e.g., data) from the host device 105. The "data" that is either input into the host device 1905 and/or output from the host device may include any of a variety of textual data, graphical data, images, combinations thereof, or other types of analog and/or digital data that is suitable for processing using the computing system 1900.

The host device 1905 includes or is associated with one or more processing units/processors, such as Central Processing Unit ("CPU") cores or processors 1930A-1930N. The CPU cores 1930A-1930N may be implemented as an Application Specific Integrated Circuit ("ASIC"), Field Programmable Gate Array ("FPGA"), or any other type of processing unit. Each of the CPU cores 1930A-1930N may be configured to execute instructions for running one or more applications of the host device 1905. In some embodiments, the instructions and data needed to run the one or more applications may be stored within the memory device 1910. The host device 1905 may also be configured to store the results of running the one or more applications within the memory device 1910. Thus, the host device 1905 may be configured to request the memory device 1910 to perform a variety of operations. For example, the host device 1905 may request the memory device 1910 to read data, write data, update or delete data, and/or perform management or other operations.

One such application that the host device 1905 may be configured to run may be a dam monitoring application 1935. The dam monitoring application 1935 may be part of a software suite or package that may be used by a user of the host device 1905 to perform DMA, AVA, and AWA, as discussed above. In some embodiments, the instructions needed to execute or run the dam monitoring application 1935 may be stored within the memory device 1910. The dam monitoring application 1935 may be executed by one or more of the CPU cores 1930A-1930N using the instructions associated with the dam monitoring application from the memory device 1910. Referring still to FIG. 19, the memory device 1910 includes a memory controller 1940 that is configured to read data from or write data to a memory array 1945. In some embodiments, the memory array 1945 may include a variety of volatile and/or non-volatile memories. For example, in some embodiments, the memory array 1945 may include NAND flash memory cores, NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory array. Generally speaking, the memory array 1945 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, optical drives, cloud memory, or any combination of primary and/or secondary memory that is suitable for performing the operations described herein.

The memories within the memory array 1945 may be individually and independently controlled by the memory controller 1940. In other words, the memory controller 1940 may be configured to communicate with each memory within the memory array 1945 individually and independently. By communicating with the memory array 1945, the memory controller 1940 may be configured to read data from or write data to the memory array in response to instructions received from the host device 1905. Although shown as being part of the memory device 1910, in some embodiments, the memory controller 1940 may be part of the host device 1905 or part of another component of the computing system 1900 and associated with the memory device. The memory controller 1940 may be implemented as a logic circuit in either software, hardware, firmware, or combination thereof to perform the functions described herein. For example, in some embodiments, the memory controller 1940 may be configured to retrieve the instructions associated with the dam monitoring application 1935 stored in the memory array 1945 of the memory device 1910 upon receiving a request from the host device 1905.

It is to be understood that only some components of the computing system 1900 are shown and described in FIG. 1. However, the computing system 1900 may include other components such as various batteries and power sources, networking interfaces, routers, switches, external memory systems, controllers, etc. Generally speaking, the computing system 1900 may include any of a variety of hardware, software, and/or firmware components that are needed or considered desirable in performing the functions described herein. Similarly, the host device 1905, the input devices 1915, the output devices 1920, and the memory device 1910 including the memory controller 1940 and the memory array 1945 may each include other hardware, software, and/or firmware components that are considered necessary or desirable in performing the functions described herein.

It is to be understood that any examples, values, graphs, tables, and/or data used herein are simply for purposes of explanation and are not intended to be limiting in any way. Further, although the present disclosure has been discussed with respect to dam monitoring, in other embodiments, the teachings of the present disclosure may be applied to similarly monitor other structures.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
acquiring, by a processor executing computer-readable instructions stored on a memory, satellite imagery of an area of an embankment;
generating, by the processor, a set of optical images from the satellite imagery;
determining, by the processor, an anomalous vegetation area and an anomalous wetness area indicative of seepage in the embankment from the set of optical images, wherein determining the anomalous vegetation area and the anomalous wetness area comprises:
performing, by the processor, a Tasseled Cap transformation on the set of optical images for obtaining a first set of data points corresponding to a greenness Tasseled Cap band and a second set of data points corresponding to a wetness Tasseled Cap band;
determining, by the processor, principal component eigenvalues from each of the first set of data points and the second set of data points;
identifying, by the processor, the anomalous vegetation area based upon a first standard deviation of the principal component eigenvalues of the first set of data points from a first mean principal component eigenvalue, using a threshold based on a multiple of the first standard deviation; and identifying, by the processor, the anomalous wetness area based upon a second standard deviation of the principal component eigenvalues of the second set of data points from a second mean principal component eigenvalue; and generating, by the processor, an alert to a dam operator, wherein the alert comprises at least one of the anomalous vegetation area and the anomalous wetness area.

2. The method of claim 1, further comprising:

removing, by the processor, at least one anomaly in the set of optical images to obtain a cleaned set of optical images by removing data points associated with the at least one anomaly; and performing, by the processor, the Tasseled Cap transformation on the cleaned set of optical images.

3. The method of claim 1, further comprising:

determining, by the processor, that a data gap exists in the first set of data points; and filling, by the processor, the data gap by:
  identifying, by the processor, a predetermined number of nearby data points adjacent to the data gap; and
  computing, by the processor, an average of a Tasseled Cap value of the nearby data points to obtain an additional data value for the data gap.

4. The method of claim 1, further comprising:

determining, by the processor, that a data gap exists in the second set of data points; and filling, by the processor, the data gap by:
  identifying, by the processor, a predetermined number of nearby data points adjacent to the data gap; and
  computing, by the processor, an average of a Tasseled Cap value of the nearby data points to obtain an additional data value for the data gap.

5. A non-transitory computer-readable medium comprising computer-executable instructions embodied thereon that, when executed by a processor, cause the processor to perform a process comprising:

acquiring satellite imagery of an area of an embankment;

generating a set of optical images from the satellite imagery;

determining an anomalous vegetation area and an anomalous wetness area indicative of seepage in the embankment from the set of optical images, wherein determining the anomalous vegetation area and the anomalous wetness area comprises:
  performing a Tasseled Cap transformation on the set of optical images for obtaining a first set of data points corresponding to a greenness Tasseled Cap band and a second set of data points corresponding to a wetness Tasseled Cap band;
  determining principal component eigenvalues from each of the first set of data points and the second set of data points;
  identifying the anomalous vegetation area based upon a first standard deviation of the principal component eigenvalues of the first set of data points from a first mean principal component eigenvalue, using a threshold based on a multiple of the first standard deviation; and
  identifying the anomalous wetness area based upon a second standard deviation of the principal component eigenvalues of the second set of data points from a second mean principal component eigenvalue; and generating an alert to a dam operator, wherein the alert comprises at least one of the anomalous vegetation area and the anomalous wetness area.

6. The non-transitory computer-readable medium of claim 5, wherein the process further comprises:

removing at least one anomaly in the set of optical images to obtain a cleaned set of optical images by removing data points associated with the at least one anomaly; and performing the Tasseled Cap transformation on the cleaned set of optical images.

7. The non-transitory computer-readable medium of claim 5, wherein the process further comprises:

determining that a data gap exists in the first set of data points; and filling the data gap by:
  identifying a predetermined number of nearby data points adjacent to the data gap; and
  computing an average of a Tasseled Cap value of the nearby data points to obtain an additional data value for the data gap.

8. The non-transitory computer-readable medium of claim 5, wherein the process further comprises:

determining that a data gap exists in the second set of data points; and filling the data gap by:
  identifying a predetermined number of nearby data points adjacent to the data gap; and
  computing an average of a Tasseled Cap value of the nearby data points to obtain an additional data value for the data gap.

9. A system comprising:

a processor; and a memory including computer-executable instructions embodied thereon that, when executed by the processor, cause the processor to perform a process including:

acquiring satellite imagery of an area of an embankment;

generating a set of optical images from the satellite imagery;

determining an anomalous vegetation area and an anomalous wetness area indicative of seepage in the embankment from the set of optical images, wherein determining the anomalous vegetation area and the anomalous wetness area comprises:
  performing a Tasseled Cap transformation on the set of optical images for obtaining a first set of data points corresponding to a greenness Tasseled Cap band and a second set of data points corresponding to a wetness Tasseled Cap band;
  determining principal component eigenvalues from each of the first set of data points and the second set of data points;
  identifying the anomalous vegetation area based upon a first standard deviation of the principal component eigenvalues of the first set of data points from a first mean principal component eigenvalue, using a threshold based on a multiple of the first standard deviation; and
  identifying the anomalous wetness area based upon a second standard deviation of the principal component eigenvalues of the second set of data points from a second mean principal component eigenvalue; and generating an alert to a dam operator, wherein the alert comprises at least one of the anomalous vegetation area and the anomalous wetness area.

10. The system of claim 9, wherein the process further comprises:
- removing at least one anomaly in the set of optical images to obtain a cleaned set of optical images by removing data points associated with the at least one anomaly; and
- performing the Tasseled Cap transformation on the cleaned set of optical images.

11. The system of claim 9, wherein the process further comprises:
- determining that a data gap exists in the first set of data points; and
- filling the data gap by:
    - identifying a predetermined number of nearby data points adjacent to the data gap; and
    - computing an average of a Tasseled Cap value of the nearby data points to obtain an additional data value for the data gap.

12. The system of claim 9, wherein the process further comprises:
- determining that a data gap exists in the second set of data points; and
- filling the data gap by:
    - identifying a predetermined number of nearby data points adjacent to the data gap; and
    - computing an average of a Tasseled Cap value of the nearby data points to obtain an additional data value for the data gap.

* * * * *